(12) United States Patent
Stepinski et al.

(10) Patent No.: US 8,577,911 B1
(45) Date of Patent: Nov. 5, 2013

(54) PRESENTING SEARCH TERM REFINEMENTS

(75) Inventors: Adam Stepinski, San Mateo, CA (US); Margaret Stewart, Palo Alto, CA (US)

(73) Assignee: Google Inc., Mountain View, CA (US)

(*) Notice: Subject to any disclaimer, the term of this patent is extended or adjusted under 35 U.S.C. 154(b) by 49 days.

(21) Appl. No.: 13/070,264

(22) Filed: Mar. 23, 2011

Related U.S. Application Data

(60) Provisional application No. 61/316,743, filed on Mar. 23, 2010.

(51) Int. Cl.
*G06F 17/30* (2006.01)

(52) U.S. Cl.
USPC ............ 707/765; 707/E17.065; 707/E17.067; 707/E17.082

(58) Field of Classification Search
USPC ............ 707/765, E17.065, E17.067, E17.082
See application file for complete search history.

(56) References Cited

U.S. PATENT DOCUMENTS

| | | | | |
|---|---|---|---|---|
| 5,983,237 | A * | 11/1999 | Jain et al. | 1/1 |
| 7,181,438 | B1 * | 2/2007 | Szabo | 1/1 |
| 7,627,582 | B1 | 12/2009 | Ershov | |
| 7,921,379 | B1 | 4/2011 | Ko | |
| 2003/0004932 | A1 * | 1/2003 | Chow et al. | 707/3 |
| 2004/0083206 | A1 * | 4/2004 | Wu et al. | 707/3 |
| 2006/0106847 | A1 * | 5/2006 | Eckardt et al. | 707/101 |
| 2011/0055760 | A1 * | 3/2011 | Drayton et al. | 715/834 |

OTHER PUBLICATIONS

Munzner, et al., "*Constellation: A Visualization Tool for Linguistic Queries from MindNet*," Proceedings of the 1999 IEEE Symposium on Information Visualization, Oct. 24-29, 1999, San Francisco, CA, USA, 4 pages.

Cugini, et al., "*Design of 3-D Visualization of Search Results: Evolution and Evaluation*," Proceedings of SPIE, 2000, 13 pages.

Collins, Christopher, "*DocuBurst: Radial Space-Filling Visualization of Document Content*," IEEE Symposium on Information Visualization, 2006, 12 pages.

Zaina et al., "*Revealing Relationships in Search Engine Results*," CLIHC'05, Oct. 23-26, 2005, Cuernavaca, México, 8 pages.

Thinkmap Visual Thesaurus, http://www.visualthesaurus.com/, Dec. 15, 2009, 4 pages.

Thinkmap, thinkmap.com/pressrelease.jsp?id=1198, Dec. 15, 2009, 2 pages.

(Continued)

*Primary Examiner* — Mahesh Dwivedi
*Assistant Examiner* — Shiow-Jy Fan
(74) *Attorney, Agent, or Firm* — Fish & Richardson P.C.

(57) ABSTRACT

Systems, software, and computer-implemented methods can be used to present search results and search refinement suggestions identified in response to a search query using a search refinement wheel. In response to receiving a search query, a set of suggested query refinements are obtained. A spoke graph structure processable to present a visual representation of the search query and at least a portion of the set of the at least one search query refinements is generated, where the search query is represented by a first node in the visual representation and each of the portion of the set of the search query refinements is represented by an individual spoke in the visual representation that can be activated to generate a corresponding new search query. The generated graph can be provided in response to the search query, e.g., to a client device from which the search query is received.

23 Claims, 16 Drawing Sheets

(56) References Cited

OTHER PUBLICATIONS

McCrickard, et al., *"Visualizing Search Results using SQWID,"* Proceedings of the Sixth International World Wide Web Conference, 1997, 10 pages.

Quintara Vision and Approach, http://replay.waybackmachine.org/20060317065125/http://www.quintura.com/quintura/, Mar. 23, 2011, 1 page.

Evri, http://www.evri.com/organization/google-0x49abc.html, Mar. 24, 2011, 3 pages.

Flowser, http://www.flowser.com/us/flowserST.html, Mar. 24, 2011, 1 page.

Etsy, http://www.etsy.com/, Mar. 24, 2011, 9 pages.

Liz Gannes, "Quintura Says Google Infringes Search Interface Patent" http://gigaom.com/2009/12/10/quintura-says-google-infringes-search-interface-patent/, Dec. 10, 2009 (12 pages).

\* cited by examiner

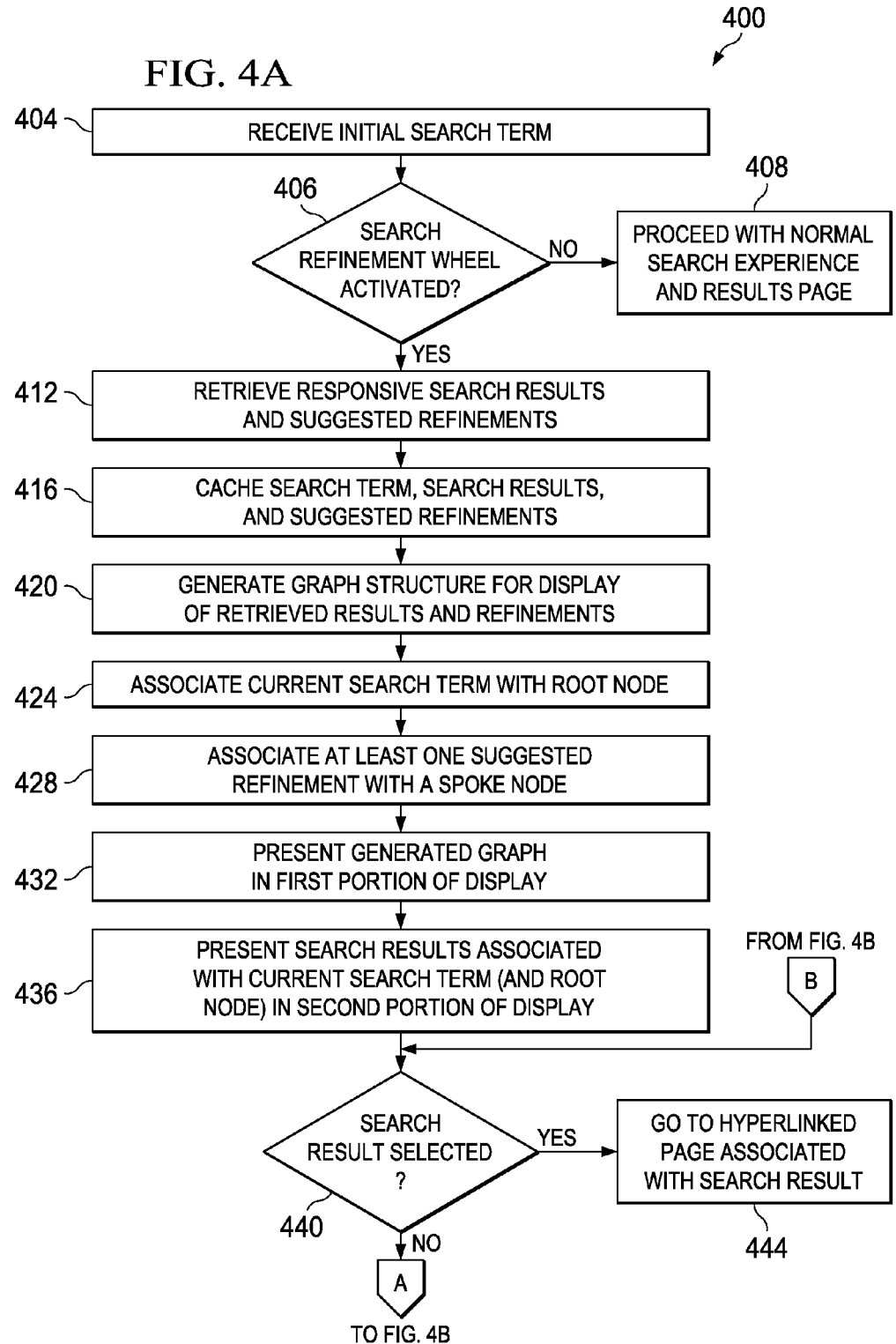

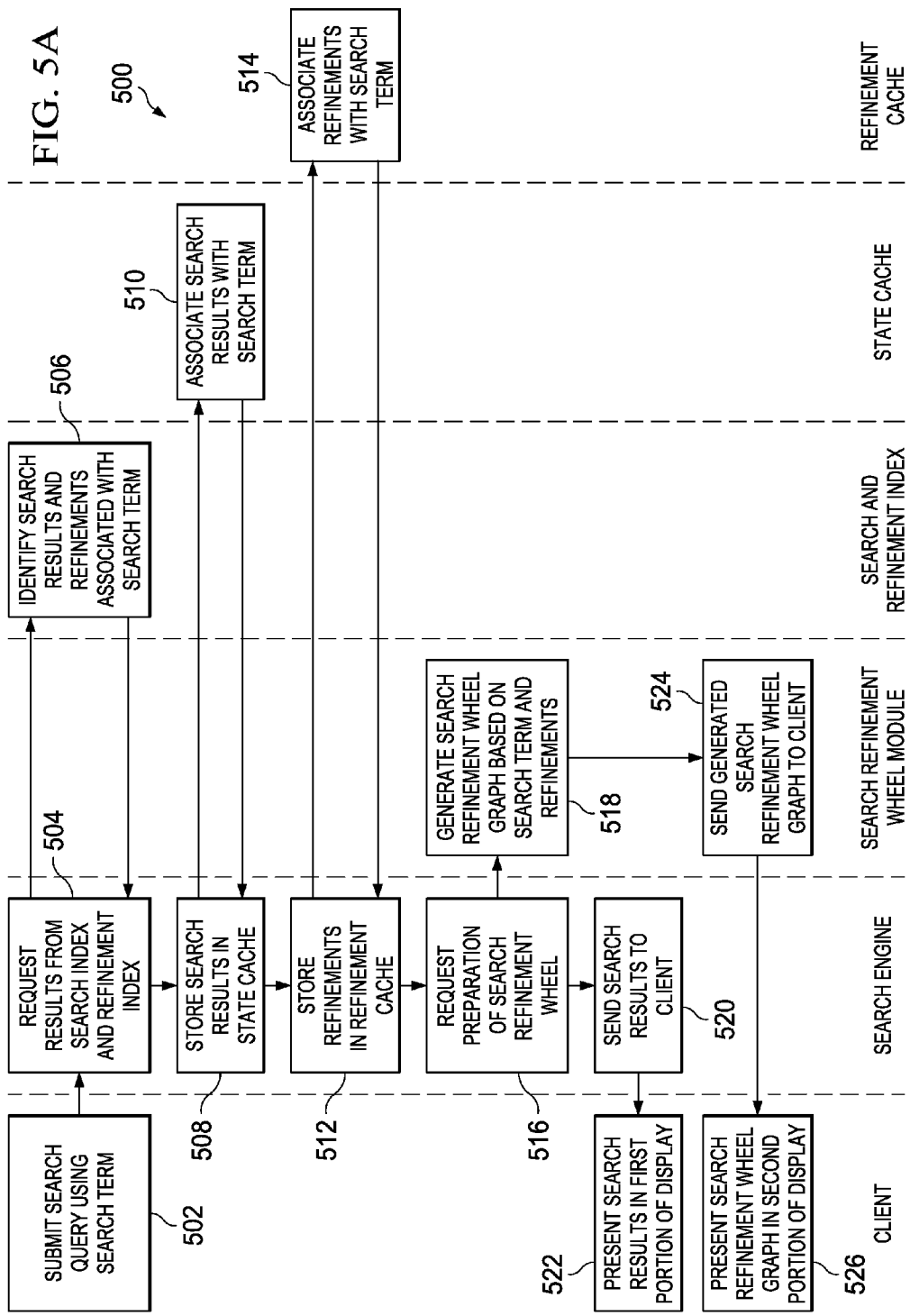

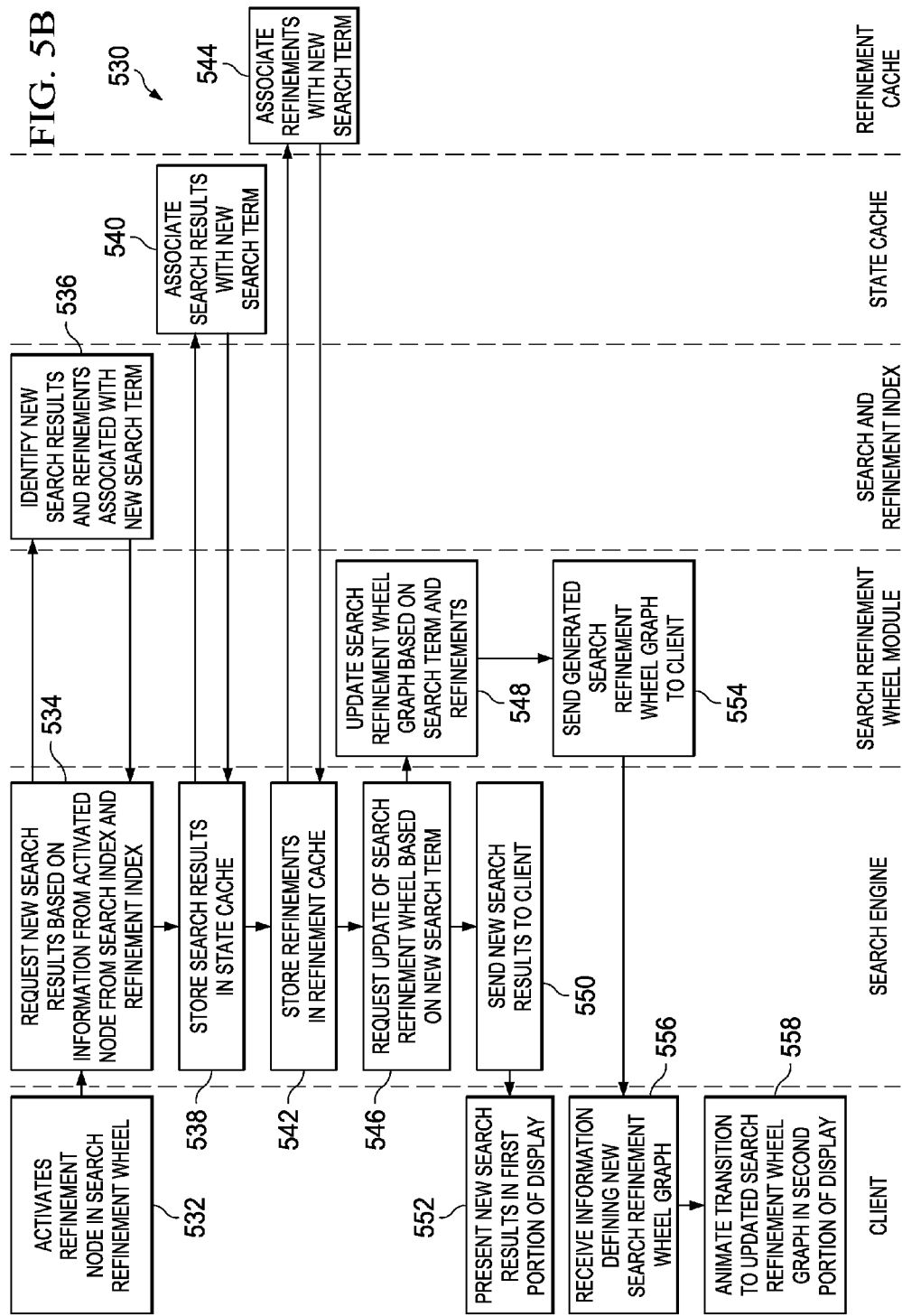

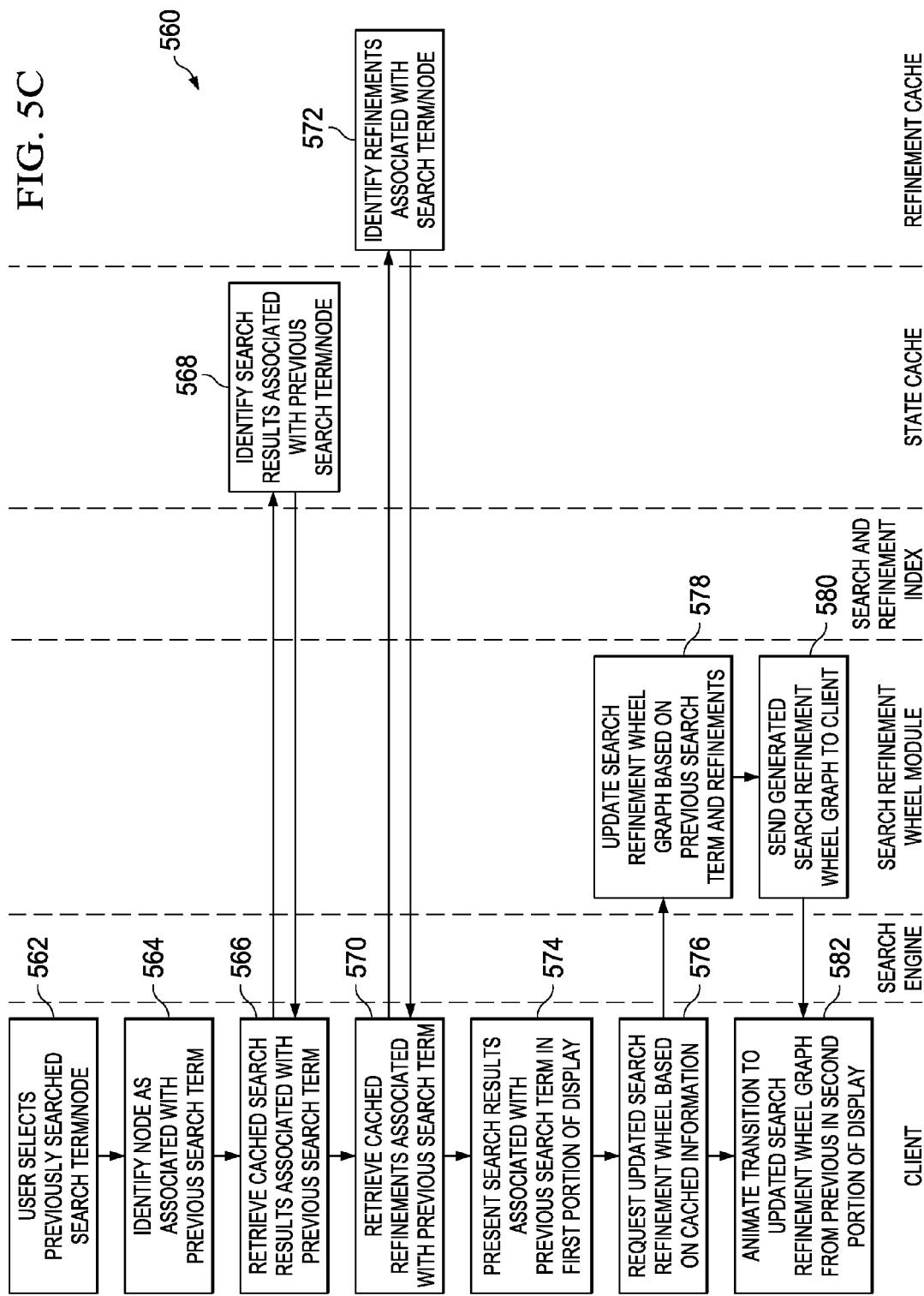

PRESENTING SEARCH TERM REFINEMENTS

CLAIM OF PRIORITY

This application claims priority under 35 U.S.C. §119 to U.S. Provisional Application No. 61/316,743, filed Mar. 23, 2010, the entire disclosure of which is incorporated herein by reference.

BACKGROUND

This specification relates presenting possible refinements to a search term or query.

Search engines allow searching of the Internet for resources, examples of which include web pages, images, video, and audio content. A typical search engine provides a web page for entering search queries. A search query can be constructed from terms entered into a web page by a user, and searches can be conducted for web pages or other files that contain the terms identified in the search query. Results of a search conducted for a particular query can be ranked and listed on one or more search results web pages. In addition to a user manually entering search terms into a search query web page, searches can be initiated through hyperlinks associated with a particular search query, such that activation of a button or hyperlink in an application or on a web page can be used to submit a search query via the search engine's associated web page.

A basic search results web page can include a list of hyperlinks to web pages, documents, and other files returned in response to a search. Additionally, the hyperlinks provided on the basic search results web page can include an additional set of information, such as a small portion of text. In some instances, this text may include one or more sentences or other portions of the hyperlinked document, as well as other information relevant to and/or associated with the particular hyperlinked document. In general, search results are presented in an inline format on a search page. In some instances, one or more related search terms (e.g., such as suggestions, recommendations, or search refinements) based on the submitted search query can also be provided to enhance the user's search experience. These suggestions, recommendations, and search refinements provide users with an opportunity to further branch out their searches.

SUMMARY

In general, one aspect of the subject matter described in this specification can be embodied in methods that include the actions of i) receiving a first search query, ii) obtaining a set of first search query refinements based on the first search query, iii) generating a spoke graph structure processable to present a visual representation of the first search query and at least a portion of the set of first search query refinements, the first search query being represented by a first node in the visual representation and each of the portion of the set of first search query refinements represented by an individual spoke in the visual representation, wherein each of the individual spokes in the visual representation includes a link for submitting a new search query based on a corresponding search query refinement, and wherein activating the link in one of the individual spokes in the visual representation is operable to submit a second search query based on the corresponding search query refinement, and v) providing the spoke graph structure in response to the search query.

These and other embodiments can each optionally include one or more of the following features, alone or in combination. For example, the first node may be a node at the center of the visual representation of the generated spoke graph structure, wherein each of the individual spokes is connected to the first node by an edge in the visual representation of the generated spoke graph structure. Additionally, each of the individual spokes in the spoke graph structure may be associated with the corresponding search query refinement, and each of the individual spokes in the generated spoke graph structure may include a link for submitting a new search query based on the respective search query refinement. Still further, the search query may be a first search query and the spoke graph structure processable to present the visual representation of the search query and at least a portion of the set of the set of search query refinements may include a first spoke graph structure, the method further comprising i) receiving an indication that one of the individual spokes associated with the corresponding search query refinement from the visual representation of the first spoke graph structure is selected by a user, wherein the selected search query refinement includes a second search query, ii) obtaining a set of search query refinements based on the second search query, iii) generating a second spoke graph structure processable to present a visual representation of the second search query and at least a portion of the set of search query refinements based on the second search query, the second search query being represented by a second node in the visual representation of the first spoke graph structure and each of the portion of the set of search query refinements represented by an individual spoke in the visual representation of the second graph structure, wherein each of the individual spokes in the visual representation of the second spoke graph structure includes a link for submitting a new search query based on a corresponding search query refinement, and wherein activating the link in one of the individual spokes in the visual representation of the second spoke graph structure is operable to submit a second search query based on the corresponding search query refinement, iv) combining the first spoke graph structure with the second spoke graph structure into a consolidated spoke graph structure, where the visual representation of the consolidated spoke graph structure presents the visual representation of the first spoke graph structure connected to the visual representation of the second spoke graph structure by an edge between the first node of the first spoke graph structure and the second node of the second spoke graph structure, and v) providing the consolidated spoke graph structure in response to the selection of the individual spoke. Additionally, the visual representation of the consolidated spoke graph structure is presented through an animated transition from the visual representation of the first spoke graph structure to the visual representation of the consolidated spoke graph structure.

Further, the spoke graph structure is included in a first portion of a search results web page, the method further comprising obtaining a set of search results responsive to the search query and including the set of search results responsive to the search query in a second portion of the search results web page in response to the search query. The first portion of the search results web page may be in a position parallel to the second portion of the search results web page. Obtaining the set of search results responsive to the search query and the set of search query refinements may comprise storing the identified set of search results responsive to the search query in a state cache and storing the set of search query refinements in a refinement cache, where the stored set of search results and the stored set of search query refinements are associated with the search query. Either or both of the state cache and the refinement cache may be a cache stored at a client device from which the search query is received and to which the spoke graph structure is provided. Obtaining the set of first search query refinements based on the first search query can include identifying a plurality of suggested refinements associated with the first search query, prioritizing the plurality of suggested refinements associated with the first search query, determining a subset of the suggested refinements representing at least a portion of the first search query refinements to be included in the set of first search query refinements, and providing the determined subset of the suggested refinements as the set of first search query refinements.

Another aspect of the subject matter described in this specification can be embodied in articles comprising a computer readable storage medium, the computer readable storage medium comprising instructions for causing one or more processors to perform operations comprising i) receiving a first search query, ii) obtaining a set of first suggested search term refinements responsive to the first search query, and iii) and generating a spoke graph structure processable to present a visual representation of the first search query and at least a portion of the set of first suggested search query refinements, the first search query being represented by a first node in the visual representation and each of the portion of the set of first suggested search query refinements represented by an individual spoke in the visual representation, wherein each of the individual spokes in the visual representation includes a link for submitting a new search query based on a corresponding search query refinement, and wherein activating the link in one of the individual spokes in the visual representation is operable to submit a second search query based on the corresponding search query refinement.

These and other embodiments can each optionally include one or more of the following features, alone or in combination. For example, the first node can be a node at the center of the visual representation of the generated spoke graph structure, wherein each of the individual spokes is connected to the first node by an edge in the visual representation of the generated spoke graph structure. The first search query can be received from a remote client device. Additionally, the instructions may further cause the processors to perform operations comprising sending the generated spoke graph structure to the client device in response to the first search query.

Other features of the article may include embodiments where the spoke graph structure processable to present the visual representation of the first search query and at least a portion of the set of first suggested search query refinements includes a first spoke graph structure. In these embodiments, the instructions may further cause one or more processors to perform operations including i) receiving an indication that one of the individual spokes associated with the corresponding search query refinement from the visual representation of the first spoke graph structure is selected, wherein the selected search query refinement includes a second search query, ii) obtaining a set of second search query refinements based on the second search query, iii) generating a second spoke graph structure processable to present a visual representation of the second search query and at least a portion of the set of second search query refinements based on the second search query, the second search query represented by a second node in the visual representation of the second spoke graph structure and each of the portion of the set of second search query refinements based on the second search query represented by an individual spoke in the visual representation of the second spoke graph structure, wherein each of the individual spokes in the visual representation of the second spoke graph structure includes a link for submitting a new search query based on a corresponding search query refinement, and wherein activating the link in one of the individual spokes in the visual representation of the second spoke graph structure is operable to submit a second search query based on the corresponding search query refinement, iv) combining the first spoke graph structure with the second spoke graph structure into a consolidated spoke graph structure processable to present a visual representation of a combination of at least a portion of the first spoke graph structure and the second spoke graph structure, where the visual representation of the consolidated spoke graph structure presents the visual representation of the first spoke graph structure connected to the visual representation of the second spoke graph structure by an edge between the first node of the first spoke graph structure and the second node of the second spoke graph structure; and v) providing the consolidated spoke graph structure in response to the selection of the individual spoke. In some instances, providing the consolidated spoke graph structure can include providing an animated transition from the visual representation of the first spoke graph structure to a visual representation of the consolidated spoke graph structure.

Additionally, the instructions may further cause the processors to perform operations comprising obtaining a set of search results responsive to the search query, wherein obtaining the set of search results responsive to the search query and the set of search query refinements based on the search query may include i) storing the obtained set of search results responsive to the search query in a state cache and ii) storing the set of search query refinements in a refinement cache, wherein the stored set of search results and the stored set of search query refinements are associated with search query. In some instances, the state cache and/or the refinement cache may comprise a cache stored at a remote client device.

Another aspect of the subject matter described in this specification can be embodied in a system comprising one or more search engine servers adapted to obtain search results associated with a particular search query, one or more search refinement servers adapted to obtain suggested refinements associated with the particular search query, and one or more search results servers adapted to generate a spoke graph structure processable to present a visual representation of the search query and at least a portion of the suggested refinements associated with the particular search query, the particular search query represented by a first node in the visual representation and each of the portion of the suggested search query refinements represented by an individual spoke in the visual representation, wherein each of the individual spokes in the visual representation includes a link for submitting a new search query based on a corresponding search query refinement, and wherein activating the link in one of the individual spokes in the visual representation is operable to submit a second search query based on the corresponding search query refinement.

These and other embodiments can each optionally include one or more of the following features, alone or in combination. For example, the one or more search refinement servers may be further adapted to i) prioritize the suggested refinements associated with the particular search query, ii) determine a subset of the suggested refinements representing at least a portion of the search query refinements to be provided to the one or more search servers based on the prioritization of the suggested refinements, and iii) communicate the subset of the suggested refinements to the one or more search results servers. Further, the one or more search results servers can be adapted to transmit the generated spoke graph structure to a client device. The client device can be adapted to present the visual representation of the generated spoke graph structure at a graphical user interface of the client device and receive a selection of one of the individual spokes in the visual representation of the spoke graph structure through the graphical user interface from a user associated with the client device, the selection indicating a new search query associated with at least one suggested refinement corresponding to the selected individual spoke. The one or more search results servers can be adapted to transmit the search results to the client device, and the client device can include a state cache adapted to store the transmitted search results. The one or more search results servers can be adapted to transmit at least the portion of the first suggested search query refinements to the client device, and the client device can include a refinement cache adapted to store the transmitted first suggested search query refinements.

The details of one or more embodiments of the present disclosure are set forth in the accompanying drawings and the description below. Other features, objects, and advantages of the invention will be apparent from the description and drawings, and from the claims.

DESCRIPTION OF DRAWINGS

FIG. 5A is an example signaling and flow diagram illustrating operations associated with presenting an initial set of search results and suggested refinements returned from a web search query including a search refinement wheel.

FIG. 5B is an example signaling and flow diagram illustrating operations associated with presenting an update of search results and suggested refinements returned after activation of a particular node in a previously-presented search refinement wheel.

FIG. 5C is an example signaling and flow diagram illustrating operations associated with presenting a search refinement wheel representing a previously-selected web search query by dynamically updating the presented search refinement wheel.

DETAILED DESCRIPTION

Figure 1:
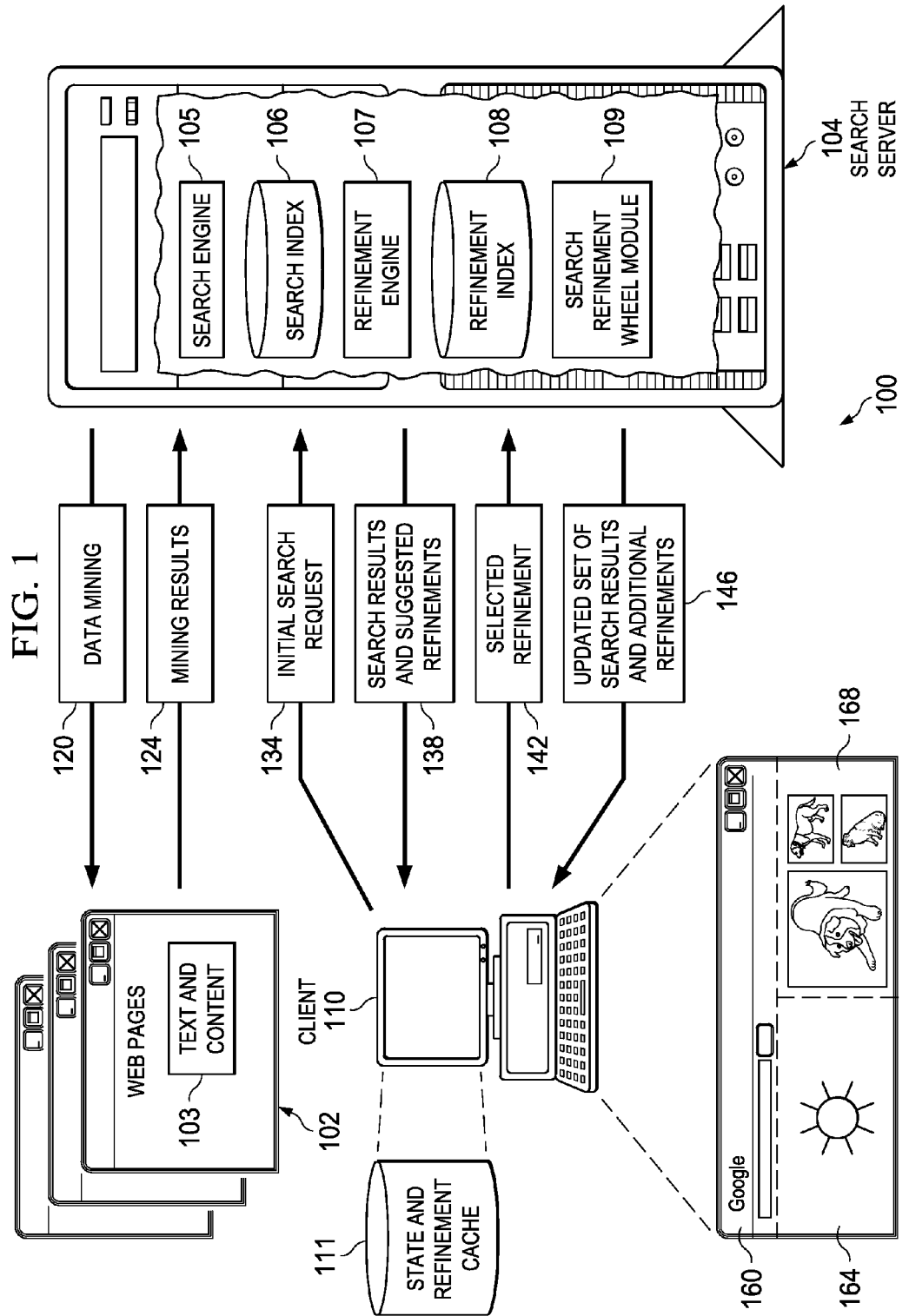
FIG. 1 is a schematic diagram of a system for presenting search results and refinement suggestions returned in response to a web search query using a search refinement wheel.

Search results and refinement suggestions returned from a web search query are presented using a search refinement wheel associated with a search engine. With conventional techniques, suggested refinements are typically included in-line with or among the search results, such as at the beginning or end of the list of returned results. Additionally, the suggested refinements may be buttons, links, or other interactive elements that direct the search engine to perform a search using the associated term or terms included in the suggested refinement. In many cases, however, following a string or combination of searches performed based on one or more suggested refinements becomes difficult as additional selections are made, and various search paths are taken. For example, after two or more suggestions are followed, the user may find it difficult to recall the number of, and basis for, previous searches performed without reviewing the browser history or activating the "back" functionality of the browser.

According to the techniques described in this specification, users are provided with a graphical view of the suggested refinements associated with the current search term, as well as a graphical view of the query path taken to that particular search term. The search results associated with the current search term can be displayed in a search refinement wheel concurrently with the graphical view of the search term, refinements, and associated query paths, with the search results being dynamically updated within the web search results page (i.e., without needing a refreshed or new page) as various refinements and paths are visited. The search refinement wheel can be used to encourage users and searchers to explore various refinements and search paths in an effort to provide users with a diverse and visually stimulating search experience. The ability to review the various search query paths through which a particular search experience has led provides users with a quick and clear description of the search history, strategy, and results that led to the current search term and related results. Another advantage of the search refinement wheel is the user's ability to easily return to previous searches or search terms used within the search path, such as by activating one or more of the previous searches on the graphical view of the search history. In general, providing a user-friendly graphical tool may encourage and allow multiple searches, including allowing users to explore various options and view results they otherwise may not have explored. In some implementations, moving from one search to another in the search refinement wheel can be performed by a user selecting a particular refinement or search term (i.e., by clicking a user interface element or node associated with the refinement), and, in response to the selection, providing an animation taking the focus of the graphical search view from the previous search term (and its refinements) to the newly-focused and selected search term, thus providing an enhanced visualization of the movement from one search to another. In some instances, concurrently with the animation, the search results portion of the web search results page is dynamically updated from the previous search term's search results to a display of the search results responsive to the newly-focused search term. As users continue to use the search refinement wheel, a full path of searches, from the initial search to the current search, may be presented to the user so that a full context associated with the search experience is available and visible to the user.

FIG. 1 is a schematic diagram of a system 100 for presenting search results and refinement suggestions returned in response to a web search query using a search refinement wheel. System 100 includes a client 110 and one or more search servers 104 that identify a plurality of web pages 102 from which search results, images, documents, and other information are retrieved and/or derived. Although illustrated and described as a single search server, the search server 104 is typically implemented as multiple servers that perform various tasks, e.g., receiving a search query, performing load balancing, parsing the search query, analyzing web indexes to identify relevant results, and ranking the results. In general, system 100 allows users of client 110 to interact with a search engine 105 (associated with the search server 104) to receive a list of search results corresponding to the current search request or query and, where applicable, one or more suggested refinements to the particular search request or query. In some instances, the suggested refinements can be based on search terms similar in wording to the submitted search query, while in other instances, the suggested refinements may instead be topically related to the search query. For instance, the suggested refinements for the term "puppy" may include "puppy training" as a similar search term, as well as the terms "kitten" or "dog." Any combination of suggested refinements may be generated and may be based on a refinement or suggestion algorithm associated with the search engine 105. Still further, additional modules, applications, or functionality associated with the search engine 105 may be used to generate the particular refinements and suggestions, e.g., the illustrated refinement engine 107, and to graphically present or illustrate the chain of search terms, results, and search results associated with a particular search, e.g., using the search refinement wheel module 109.

The system 100 is capable of conducting communications between the client 110, one or more search servers 104, and web servers hosting the web pages 102 through one or more networks, including the Internet. The client 110 can include, among other software and components, a web browser capable of receiving data from both the search server 104 and one or more of the plurality of web pages 102. Each of the plurality of web pages 102 may also include various sets of text and content 103, including hypertext markup language (HTML) documents, Adobe PDF documents, multimedia links, and other items or documents suitable for inclusion in a web page. Additionally, each web page may itself be a document other than a web page, such as an Adobe PDF document, a word processing document, a spreadsheet, a database, or any other document associated with a defined uniform resource locator (URL) or other web-addressable location accessible to either or both of the client 110 or the search server 104.

To allow users to return to previous searches, a state and refinement cache 111 is illustrated within the client 110 to allow for information regarding previous searches to be stored. Accordingly, users may select a node associated with a previous search, and instead of performing a new search for search results and suggested refinements by sending additional information to the search engine 105, the client 110 can access the already-retrieved search results and refinements and present them to the user in cooperation with the instance of the search refinement wheel presented to the user. In other words, when a user clicks on a previous refinement, the data associated with that previous refinement is loaded from the client's state and refinement cache 110, removing the need to retrieve additional information from the server 104 and search engine 105. In general, this technique can allow the process of browsing previously-viewed refinements much more responsive, and remove latency associated with sending additional requests to the server 104. Various techniques may be used to store the state and refinement cache 111 on the client 110, including storing the cache 111 in memory, or using an associated web browser's features to store the search and refinement data if a user clicks on a search result.

The search server 104 is a web-based server accessible to clients 110 and capable of communicating with web servers that host the plurality of web pages 102. The illustrated search server 104 includes a search engine 105, a refinement engine 107, and a search refinement wheel module 109. The search engine 105 may be implemented as a set of applications or programs capable of receiving and performing searches based on user input received from the client 110 in combination with indexed text and content 103 previously retrieved from the plurality of web pages 102. In particular, the search server 104 may include a web index 106 containing indexed information from the plurality of web pages 102 that is used to respond to search queries and/or requests. In some instances, one or more search indexes 106 may be present in a particular system, including some indexes located remote from a particular server that initially receives the search query. In those instances, the search engine 105 may send search requests to the one or more remote search indexes to retrieve information associated with a particular search term or query.

The search server 104 also includes a refinement engine 107, which is responsible for generating one or more search refinement suggestions based upon received user search queries and/or requests. In some instances, the refinement engine 107 may be a module or process included as part of the search engine 105, while in other instances, the refinement engine 107 may be a standalone application. In general, the refinement engine 107 works with the search engine 105 to determine appropriate refinements to be suggested to users when the search results associated with the submitted search term are returned. The refinement engine 107 may use any appropriate algorithm, formula, operation, or process to determine the appropriate refinements to suggest, including determinations based at least in part on profiles associated with the particular user working with or at the client 110. For example, based on a first user's history of searches, a particular refinement may be given more weight and returned with a set of search results, while for a second user, the particular refinement will not be determined as an appropriate suggestion and not returned to the user. In other words, the refinements suggested by the refinement engine 107 can be user-specific to provide targeted suggestions and search refinements to each user to provide a more personalized search experience.

The search server 104 also includes the search refinement wheel module 109. The search refinement wheel module 109 allows search terms, suggested refinements, and search results to be presented in a graphical manner, such that additional exploration and user-friendly presentations of search histories and suggestions can be provided. For example, the search refinement wheel module 109 may contain the instructions and perform the operations for generating, updating, animating, and storing the various data needed to create and present the search refinement wheel in connection with the search results and suggested refinements returned by the search engine 105 and the refinement engine 107. In some instances, the search refinement wheel module 109 may be included within, or part of the functionality of, the search engine 105 and/or the refinement engine 107. Generally, the search refinement wheel module 109 is used to generate and maintain the visual representation of a string or history of searches, e.g., by presenting each search term as a node on a graph structure, which may also be described as the search refinement wheel. Each suggested refinement provided by the refinement engine 109 is presented as a subordinate, or related, node connected to the submitted search term node in the graph structure.

Along with the presented nodes of the search refinement wheel 164 (illustrated in a first portion of the displayed search results page), the search results associated with the current search term are provided in a second portion of the displayed search results page. Further, when a particular suggested refinement node is selected, the search refinement wheel can automatically update, in some cases animating from the previous state to the newly-selected state, to focus on the newly-selected refinement as the center or primary node, moving the previously submitted search term into a secondary position. The previously submitted search term will generally be connected to the newly-selected refinement by an edge, or line, that connects the two nodes and indicates the temporal search history relationship between the two. Users can quickly ascertain the relationship and progression of the search through the illustrated connections, allowing for immediate understanding and recall of the search history leading to the current page. When a new node is selected, the search results section presented in the second portion of the display can be updated to present search results associated with the newly-selected node. In some implementations, updating the search refinement wheel and the presented search results can be a dynamic transition, or can be performed without refreshing the web search results page or navigating to a new page.

FIG. 1 generally illustrates several processes associated with presenting search results and refinement suggestions returned from a web search query using the described search refinement wheel. As shown by arrow 120, data mining servers associated with the search server 104 access one or more of the plurality of web pages 102 to perform data mining operations related to the search engine 105 and/or the refinement engine 107. For example, these data mining operations may include any relevant type of web page indexing and analysis, including, but not limited to, storing and indexing web page information, such as the web page's text and content 103, as well as determining a rank of the page according to one or more predefined ranking algorithms. In response to the data mining operations, arrow 124 illustrates that the mining results, which may include both basic and advanced web page information for indexing purposes, may be returned to the search server 104. The returned information may be used by both the search engine 105 and the refinement engine 107 to categorize, rank, store, and index information for future use and searches. As previously noted, relevant information can be stored in both the search index 106 and the refinement index 108.

The client 110 may access a web page associated with the search engine 105. One example search engine is the Google™ search engine provided by Google Inc. of Mountain View, Calif., U.S.A. Using the basic web search page associated with the particular search engine 105, a user associated with the client 110 may type in one or more search terms and submit an initial search request to the search engine 105 (as shown by arrow 134). The search engine 105 can identify one or more search results responsive to the request, including, but not limited to, web pages, documents, or other items included within the search index 106) to return to the client 110 and present to the user. Additionally, the refinement engine 107 may analyze the submitted search term(s) to determine one or more suggested refinements from the refinement index 108 to return to the client 110 with the search results. As previously discussed, those suggested refinements can be based on the search terms received, information about searches performed by other users, and, in some instances, user profile or search history information available to the refinement engine 107. To allow for additional navigation, certain information may be cached at the search server 104 or client 110 after each search is performed. As illustrated in FIG. 1, state information and refinement information is stored in the state and refinement cache 111 of the client 110 after each search. For example, the suggested refinements, and in some cases, the search results, associated with a particular search term can be stored in the state and refinement cache 111 to allow for easy and quick navigation within the user's recent search history, such as through a web browser's history or local user memory. The refinements and search results may be associated with the appropriate search term in a database, spreadsheet, table, or other appropriate structure or file to allow quick access and retrieval of information based on the focused or submitted search term. Although illustrated as associated with the client 110, in some instances the search and refinement cache 111 may be stored at the server 104.

Once the search results and suggested refinements are identified at the search server 104, the search engine 105 prepares the combined information for presentation to the client 110. In some instances, the search refinement wheel module 109 may be activated such that the search results, suggested refinements, and search term are used to generate an instance of the search refinement wheel. Where the search refinement wheel module 109 is not active, the search engine 105 can send a generic web search results page to the client 110 for presentation to the user. Where the search refinement wheel module 109 is activated, however, the search engine 105, in combination with the functionality of the search refinement wheel module 109, generates the search refinement wheel instance and sends a graphical representation of the search refinement wheel instance to the client 110 (as indicated by arrow 138). An example instance of the search refinement wheel 164 is presented in the returned web search results page 160. As mentioned, the search term from the initial search request may be illustrated at the center node in the graph structure, with one or more of the suggested refinements being represented by peripheral nodes connected to the center node through lines (or edges) indicating their relationship as suggested refinements to the search term. Additionally, the set of search results responsive to the search term are presented at 168 in the displayed results page 160.

The user of client 110 may select one of the suggested refinements as the new search term to continue the search experience. When a particular suggested refinement is selected, the particular suggested refinement is returned to the search engine 105 (illustrated by arrow 142) and handled by the search engine 105 (and the refinement engine 107) as a new search term, where new search results and additional suggested refinements will be identified from the search index 106 and the refinement index 108. The new search results and additional suggested refinements are returned to the client 110 (arrow 146), along with an indication to update the graphical representation of the search refinement wheel instance to the new search term, where the new search term is the previously selected suggested refinement. In many instances, the search refinement wheel module 109 may be involved in the generation of the updated search refinement wheel instance, including an animated transition from the previous state of the wheel to the new state based on the updated search term, search results, and suggested refinements. The web search results page 160 presents the updated search refinement wheel 164 and the updated search results 168 associated with the new search term. The user may continue to select additional refinements, causing the operations associated with arrows 142 and 146 to be repeated any number of times. In some instances, the search refinement wheel may only visualize a certain number of nodes in the search path at one time, while in others, different node states may be used to illustrate previous searches at various levels and times in the search history. Further, some instances may allow for all information to be dynamically updated in a single web search results page 160 without requiring a new page or refreshing of the page. Certain technologies may be used to generate and operate the search refinement wheel, including Adobe's Flash, ActionScript (and the Flex framework), JavaScript, or other suitable technologies.

Figure 2:
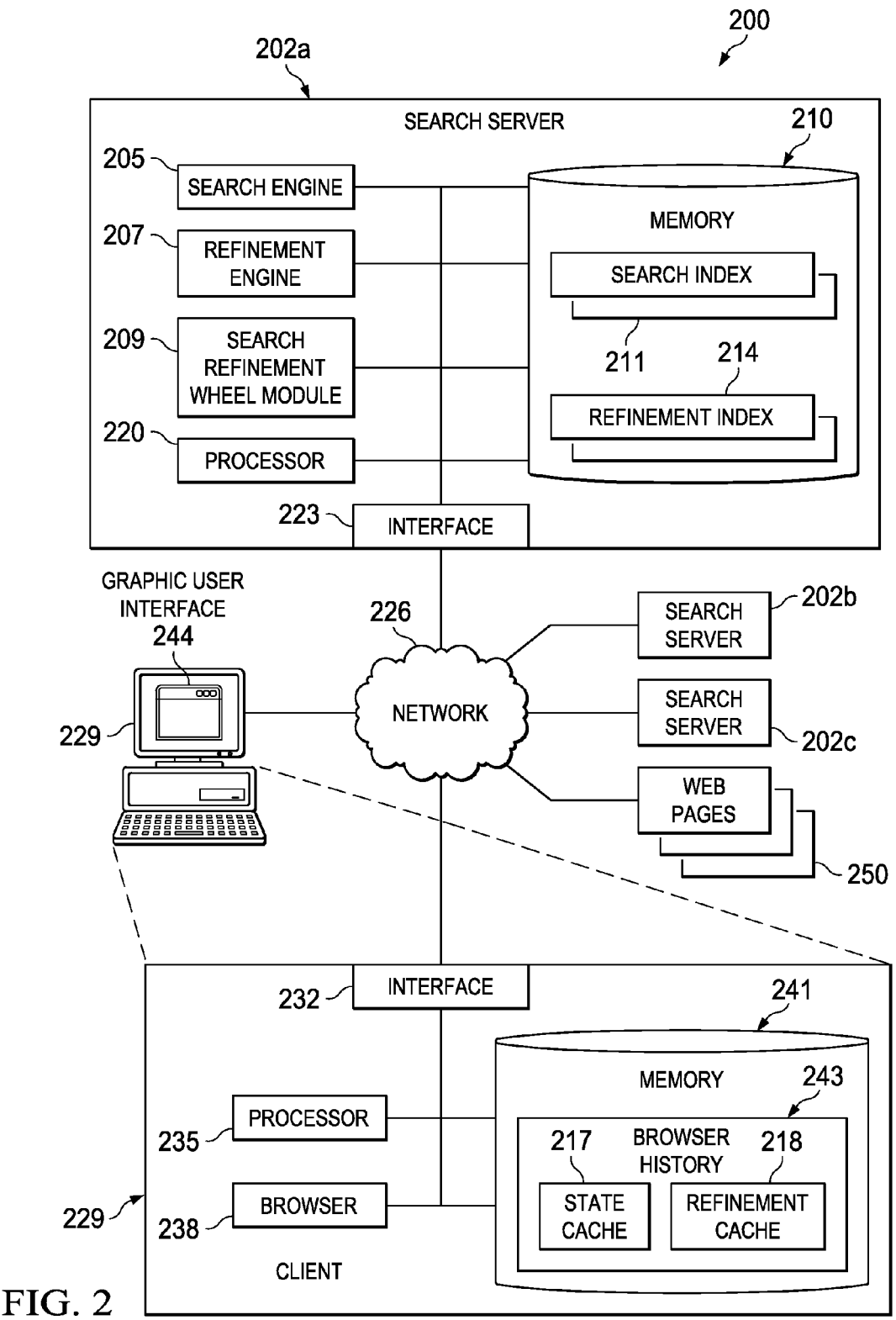
FIG. 2 is a block diagram illustrating an example configuration of a system for presenting search results and refinement suggestions returned using a search refinement wheel.

FIG. 2 is a block diagram illustrating an example configuration of a system 200 for presenting search results and refinement suggestions using a search refinement wheel. As shown, system 200 includes, or is communicably coupled with, one or more search servers 202, a client 229, a network 226, and a plurality of web page servers 250. The client 229 is capable of sending, via the network 226, one or more search queries to the search engine 205 of the search server 202a. In response to the query, the search server 202a (and particularly, the search engine 205 in combination with the refinement engine 207) transmits at least one set of search results, along with a set of suggested refinements associated with the search query, back to the client 229.

The search server 202a (as well as search servers 202b and 202c) may include a processor 220, a memory 210, an interface 223, the search engine 205, the refinement engine 207, and the search refinement wheel module 209. In general, each server 202 may be an electronic computer device operable to receive, transmit, store, process, or manage data associated with the system 200. The search server 202 of system 200 may be implemented using a server pool or multiple server pools.

The search server 202a includes the processor 220. Although illustrated as a single processor, multiple processors 220 may be used in some implementations. In FIG. 2, processor 220 executes the operations necessary to support the search engine 205, the refinement engine 207, and the search refinement wheel module 209.

The search engine 205 may be accessed across network 226 from multiple client devices (although only a single client 229 is illustrated in FIG. 2), each of which may be located locally or remotely from server 202a. The search engine 205 may be accessed by the client 229 and other devices to perform searches for web pages, documents, or other files available from the search server 202a, from other servers (i.e., search servers 202b or 202c) accessible through network 226, or though other networks or connections not illustrated in FIG. 2. In some implementations, the search engine 205 may be supported by multiple servers in, for example, a distributed server architecture. In addition to performing searches, the search engine 205 (or another component related to or associated with the search engine 205) can perform indexing operations on the plurality of web pages 250, analyzing the various web pages using data mining and indexing techniques while creating various indexes (such as search index 211) stored in memory 210.

The refinement engine 207 of FIG. 2 may be a part of the search engine 205. In some instances, the refinement engine 207 may comprise a module, sub-program, or other functionality of the search engine 205, while in other instances, the refinement engine 207 may be its own program or software capable of interacting with the search engine 205 and search refinement wheel module 209 to perform its functions. In general, the refinement engine 207 performs the operations of analyzing a received search query or term and determining one or more suggested refinements. Similar to the refinement engine 107 in FIG. 1, the refinement engine 207 accesses a refinement index 214 in memory 210 to retrieve the suggested refinements for a particular search term. In some instances, the refinement engine 207 may consider previous user searches, as well as other relevant user information, to determine a unique or personalized set of suggested refinements in response to a received search term. Once a set of suggested refinements is generated, the particular refinements can be provided to the search engine 205 for incorporation into the results of the search query, while also storing or caching the suggested refinements in a refinement cache 218, where the suggested refinements are associated with the corresponding search term or query.

The search refinement wheel module 209 is associated with the operations involved in generating the graphical structure and illustration of particular instances of the search refinement wheel. Similar to the search refinement wheel module 109 described in FIG. 1, the search refinement wheel module 209 can be used to visually and functionally combine the search query (or search term), suggested refinements, and search results into a cohesive display in response to search requests submitted by client 229. In addition to generating the initial search refinement wheel instance, the search refinement wheel module 209 may be responsible for dynamically updating the search refinement wheel instance as suggested search term refinements are selected from the interactive display and updated results are generated. In some instances, the search refinement wheel module 209 may be capable of animating transitions between states of the search refinement wheel, such as when a suggested refinement is selected and the focus of the graphical element is shifted to the newly-selected refinement.

Illustrated memory 210 may include any memory or database module, and may take the form of volatile or non-volatile memory including, without limitation, magnetic media, optical media, random access memory (RAM), read-only memory (ROM), removable media, or any other suitable local or remote memory component. For example, memory 210 may store various indexes, classes, applications, backup data, jobs, parameters, cookies, variables, algorithms, instructions, rules, or references thereto. As illustrated in FIG. 2, memory 210 includes a search index 211, a refinement index 214, a state cache 217, and a refinement cache 218. Although illustrated in memory 210, some or all of these items may be located external to memory 210 and/or server 202a in some implementations (e.g., in multiple different memories or different servers, such as additional or alternative indexes stored at search servers 202b and/or 202c, as well as other suitable locations accessible to search server 202a). In the present example of system 200, the search index 211 generally stores information relevant to identifying one or more web pages or web-addressable documents that have been analyzed and indexed by the search engine 205. When the search engine 205 receives search queries and requests from the client 229, the search engine 205 can access the search index 211 to determine which previously-analyzed web pages 250 meet the parameters, search terms, and other elements of the search query.

The refinement index 214 illustrated in memory 210 stores information and suggestions accessed and analyzed by the refinement engine 207 when searches are received. As described above, the refinement engine 207 reviews the search terms in a received request to recommend, or suggest, particular refinements to the search query or terms.

The search server 202a also includes interface 223 for communicating with other computer systems, search servers (e.g., search servers 202b and 202c), clients 229, and web pages 250 over network 226. Generally, interface 223 comprises logic encoded in software and/or hardware in a suitable combination operable to communicate with the network 226. More specifically, interface 223 may comprise software supporting one or more communication protocols such that the network 226 or hardware is operable to communicate physical signals.

The network 226 facilitates wireless or wireline communication between the search server 202a and any other local or remote computer, including one or more clients 229 in the system 200. Indeed, while illustrated as a single network, network 226 may be a discontinuous network, so long as at least a portion of the network 226 may facilitate communications between senders and recipients. An example wireless link may be provided via 802.11a/b/g, 802.20, WiMax, or other types of wireless links. The network 226 can encompass any internal or external network, networks, sub-network, or combination thereof operable to facilitate communications between various computing components inside and outside the illustrated system 200. The network 226 may communicate, for example, Internet Protocol (IP) packets, Frame Relay frames, Asynchronous Transfer Mode (ATM) cells, voice, video, data, and other suitable information between network addresses. The network 226 may include one or more local area networks (LANs), radio access networks (RANs), metropolitan area networks (MANs), wide area networks (WANs), all or a portion of the Internet, one or more wireless phone networks, and/or any other communication system or systems at one or more locations.

The illustrated environment of FIG. 2 also includes one or more clients 229. Each client 229 is any computing device operable to connect or communicate at least with the search server 202a and/or the network 226 using a wireline or wireless connection. Further, each client 229 includes an interface 232, a processor 235, a web browser application 238, a graphical user interface (GUI) 244, and a memory 241. In general, the client 229 is an electronic computing device operable to receive, transmit, process, and store any appropriate data associated with the environment 200 of FIG. 2. There may be any number of clients 229 associated with environment 200, as well as any number of clients 229 external to environment 200. For example, while illustrated environment 200 of FIG. 2 includes only a single client 229, alternative implementations of environment 200 may include two or more clients communicably coupled to the search server 202a (and/or to search servers 202b and/or 202c). There may also be one or more additional clients 229 external to the illustrated portion of environment 200 that are capable of interacting with the environment 200 via the network 226. Further, the term "client" and "user" may be used interchangeably in this specification. Moreover, while each client 229 is described in terms of being used by one user, this disclosure contemplates that many users may use one computer or that one user may use multiple computers. As used in this disclosure, client 229 is intended to encompass a personal computer, touch screen terminal, workstation, network computer, kiosk, wireless data port, smart phone, personal data assistant (PDA), one or more processors within these or other devices, or any other suitable processing device. For example, each client 229 may be a computer that includes an input device, such as a keypad, touch screen, mouse, or other device that can accept information, and an output device that conveys information associated with the operation of the search server 202a or the client 229, including digital data, visual information, or the GUI 244. Both the input device and the output device may include fixed or removable storage media such as a magnetic computer disk, CD-ROM, or other suitable media to both receive input from and provide output to users of the client 229 through the display, namely the GUI 244.

The interface 232 of the client 229 may be similar to interface 223 of the search server 202a in that it may comprise logic encoded in software and/or hardware in a suitable combination and operable to communicate with the network 226. More specifically, interface 232 may comprise software supporting one or more communication protocols such that the network 226 or hardware is operable to communicate physical signals to and from the client 229.

Similarly, memory 241 of the client 229 may be similar to memory 210 of the search server 202a, and may include any memory or database module and take the form of volatile or non-volatile memory including, without limitation, magnetic media, optical media, random access memory (RAM), read-only memory (ROM), removable media, or any other suitable local or remote memory component. For example, memory 241 may store backup data, parameters, cookies, variables, algorithms, instructions, rules, or references thereto, as well as any other suitable data. Further, memory 241 may include a browser history 243 comprising a list of locations that the web browser 238 has visited, as well as the various parameters and URLs associated with those locations. The browser history 243 may be accessible to the web browser 238 and any associated user, thus allowing the web browser 238 to return to previously-visited URLs using "back" and "forward" functionality associated with conventional browsers, as well as jumping forward or backward to one or more specific locations within a web browsing history.

Memory 241 and the browser history 243 may also include the state cache 217 and the refinement cache 218. Both the state cache 217 and the refinement cache 218 may be used to store information regarding a particular query path or search history. For example, the state cache 217 can store information associated with a set of search results returned in response to a search for a particular term or query, while the refinement cache 218 can store the sets of refinements returned for those same particular terms and queries. In some instances, the state cache 217 and the refinement cache 218 may be combined into a single element or cache. In both instances, the sets of information stored in the caches are associated with the particular search term or query corresponding to each search result and refinement. When the client 229 goes back to a particular point in a search history, the browser history 243, the state cache 217, and the refinement cache 218 may be used to determine whether the search terms selected have already been reviewed, and if so, retrieve the previously-cached search results and suggested refinements without requiring a new search and additional requests to the associated search engine 205 and refinement engine 207. In these instances, the data associated with the search refinement wheel instance can be populated using the information cached in these two locations, making it unnecessary to retrieve additional information from the server. In alternative instances, the cached information may also be stored generally in memory 241 (i.e., not associated with the browser history 243), in another location at the client 229, and at another location associated with client 229 via network 226, including one or more of the search servers 202. Where the information is stored at one of the search servers 202 or another location other than the client 229, the information may be retrieved without requesting that a new set of search results and suggested refinements be determined by the search engine 205 and the refinement engine 207.

The GUI 244 comprises a graphical user interface operable to allow the user to interface with at least a portion of environment 200 for any suitable purpose, including generating a visual representation of search results provided to the client 229 by the search engine 205 in response to a query sent from the client 229, as well as to allow users at each client 229 to view those visual representations. Generally, the GUI 244 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 244 can be any graphical user interface, such as a web browser, touch screen, or command line interface (CLI) that processes information in the environment 200 and efficiently presents the results to the user. In general, the GUI 244 may include a plurality of user interface (UI) elements such as interactive fields, pull-down lists, and buttons operable by the user at the client 229. These UI elements may be related to the functions of one or more applications executing at the client 229, such as a business application or the web browser associated with the GUI 244. In particular, the GUI 244 may be used in connection with the web browser 238 associated with the GUI 244 to view and navigate to various web pages, some of which may be associated with (or the visual representation of) the plurality of web pages 250 associated with network 226 and identified by the search engine 205 (as illustrated in FIG. 2). For purposes of the present disclosure, the term "web browser" and "GUI" may be used interchangeably, such that the GUI 244 may be referred to as the "web browser 238."

In some instances, the GUI 244 (or the web browser 238) is a software application which enables the client 229 (or a user thereof) to display and interact with text, images, videos, music, and other multimedia files and information typically located in web page files received from one or more web servers (e.g., search server 202*a*, or information from web servers hosting one or more of the plurality of web pages 250), or other computers accessible via the network 226. Additionally, the GUI 244 (or web browser 238) allows the client 229 to present a search engine web page associated with the search engine 205 that allows the client 229 to submit web search queries, as well as to present the results identified by the search engine 205 associated with those web search queries. Text and images embedded within web pages displayed by the web browser 238 can contain hyperlinks (or other logical network addresses) to other web pages, with some of those web pages associated with different web servers and domains than the web page containing the hyperlink (e.g., the list of hyperlinks to various web pages identified by the search engine 205). Users of client 229 can quickly and easily access information associated with the various web pages by navigating those links using the web browser 238. In general, the web browser 238 formats web pages stored as HTML documents, XHTML documents, text files, or any other suitable files for display via the GUI 244, so the visual appearance of a particular web page 250 may differ between various types of browsers. As illustrated in FIG. 2, the web browser 238 can connect to the search engine 205 and web pages 250 via the network 226. Example web browsers 238 may include Microsoft's Internet Explorer, Mozilla's Firefox, Apple's Safari, Opera Software ASA's Opera browser, and Google's Chrome, as well as any other suitable browser. In certain implementations, the web browser 238 may be associated with, or may be a portion or module of, a business application, providing web browser or similar web page processing and visualization functionality to the application. As previously described, the web browser 238 can be used to view and interact with the web search results page and search refinement wheel generated in system 200.

While FIG. 2 is described as containing or being associated with a plurality of components, not all components illustrated within the illustrated implementation of FIG. 2 may be utilized in each alternative implementation of the present disclosure. Additionally, one or more of the components described herein may be located external to environment 200, while in other instances, certain components may be included within or as a portion of one or more of the other described components, as well as other components not described. Further, certain components illustrated in FIG. 2 may be combined with other components, as well as used for alternative or additional purposes, in addition to those purposes described herein.

Figure 3A:
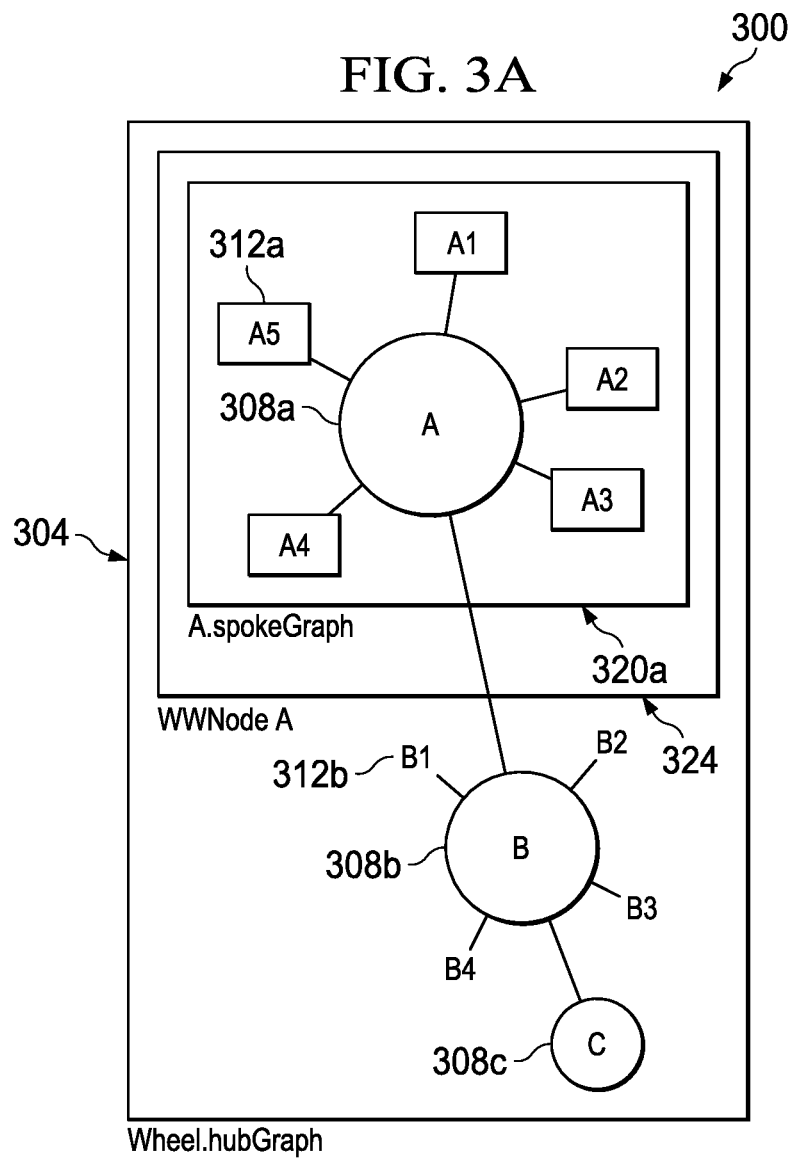
FIG. 3A is an example block diagram illustrating a generic search refinement wheel.

FIG. 3A is an example block diagram illustrating a generic search refinement wheel. In general, the search refinement wheel may be implemented as a single graph or multiple nested graphs. As illustrated in FIG. 3A, search refinement wheel 300 is implemented as several individual but interconnected graphs, wherein the search refinement wheel is represented by multiple levels of nodes and graphs. The search refinement wheel module and search refinement wheel instances can be built and based upon a graph framework for drawing and animating graphs, such as Adobe Flash or any other suitable framework. In one particular implementation, the main classes of the graph framework are Node and Edge. The graphical relationships between different entities are represented through object references: a node has references to the edges that connect to it, and an edge has references to the two nodes it connects. Both the Node class and the Edge class have draw( ) methods that will draw the object. The Node class has some additional properties used when drawing the node:

position: a two-dimensional coordinate indicating the position of the node in the graph.

scaleX and scaleY: the relative scale of the graphics associated with the node.

state: a reference to the node's state. Node states are explained in more detail below in reference to FIG. 3B.

A third class, Graph, has references to both types of objects, and manages all of the references through methods to add and delete nodes and edges.

The Node, Edge, and Graph classes may extend a Canvas class, such as the Canvas class included in Adobe's Flex. Canvas is a container that allows child components to be freely positioned within the container itself. The Canvas class can also be used to draw simple graphics. In some instances, nodes and edges can only draw and add components within their own container. In those instances, and by keeping the graphics associated with each node and edge isolated from each other, the appearance of the graph can be updated by redrawing only a specific node or edge, rather than redrawing the entire graph. Also, moving a node instance can be done by changing the position of the container instead of requiring the node to redraw its graphics. In some instances, however, an edge connected to a moved node may need to be redrawn in order to reflect its new endpoint.

The Graph class has four overlapping children Canvas objects:

edgeCanvas: contains the Edge objects that are part of the graph.

nodeCanvas: contains the Node objects that are part of the graph.

effectsCanvas: a container for drawing temporary "effects."

mouseOverCanvas: a container for drawing mouseover-related graphics.

Generally, using separate containers to hold nodes and edges can assist in allowing the nodes to be drawn above the edges. Similarly, temporary effects and mouseover-related graphics can be kept above the edges and nodes.

Figure 3B:
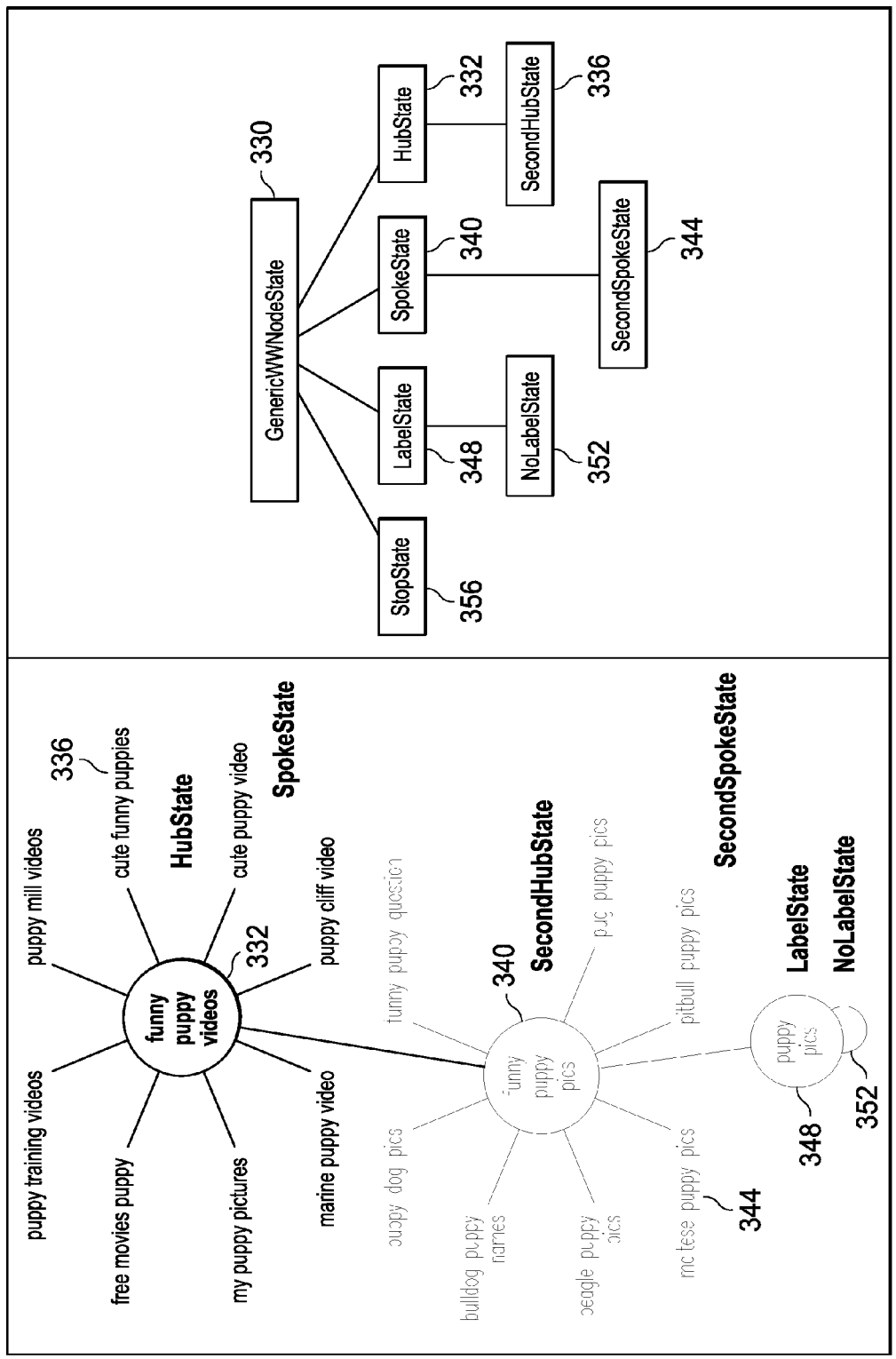
FIG. 3B illustrates examples of node states associated with a generic search refinement wheel.
Figure 3C:
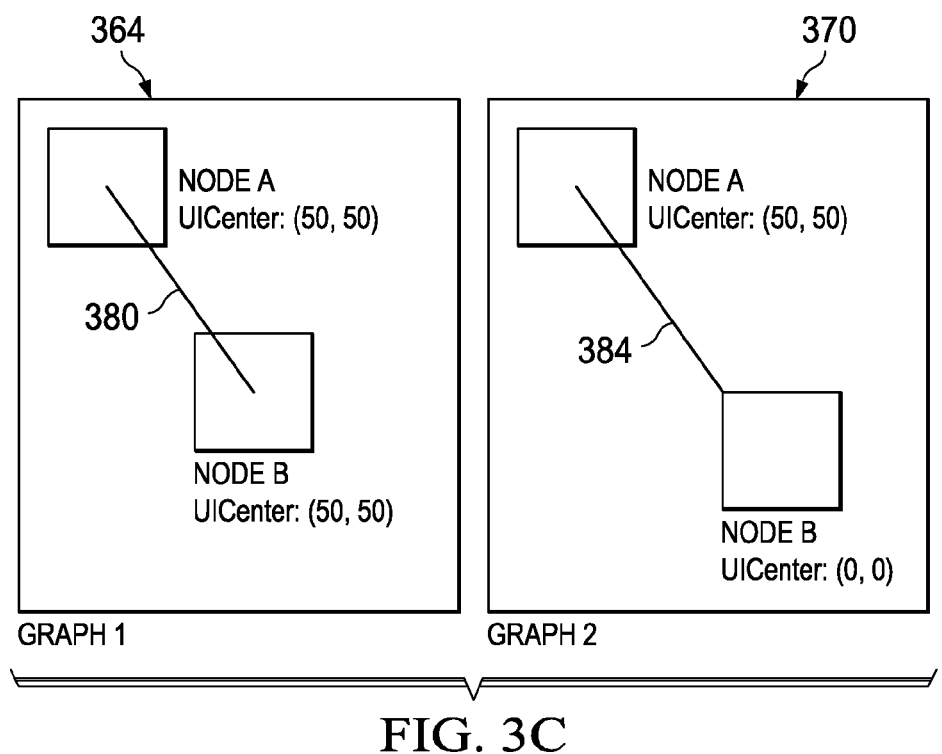
FIG. 3C is an example block diagram illustrating a connection between two generic nodes in a search refinement wheel.

In general, drawing an edge may be simple. For example, an edge from node A to node B draws a line segment from A's position to B's position. Drawing a node, however, may be more complicated. In some instances, a node's UI component (or visual representation) may be centered over the node's position, while at other times, the corner of the node's UI component will be aligned with the node's position. The offset between a particular node's UI component and the node position is called the UICenter. FIG. 3C is an example block diagram illustrating a connection between two generic nodes in a search refinement wheel. As illustrated in graph 364 and graph 370 of FIG. 3C, lines, or edges, 380 and 384, are drawn between nodes A and B (the endpoints of the lines are the two node positions). In graph 364, node B has a UICenter that is half the width and half the height of the UI component. This UICenter will center the UI component over the node's position. In graph 370, the UICenter for node B is (0, 0). Thus, the UICenter of node B in graph 370 aligns the top left corner of the UI component with the node position. Creating a node's UI component and calculating the UICenter is handled by the node state.

Each node instance has a NodeState used as part of a state pattern. The state pattern separates node properties (e.g., position, scale, etc.) from the node's appearance and behavior by delegating functions that handle appearance and behavior to the node state. A NodeState may implement the following methods:

drawComponent( ) draws the visual appearance of the node and returns the UICenter.

drawMouseOverComponent( ) draws the visual appearance of the node on a mouseover.

handleClick( ) executes when a user clicks on the node.

handleMouseOver( ) executes when the user hovers over the node.

edgeColor( ) returns the color of an edge extending to this node.

edgeThickness( ) returns the line thickness of an edge extending to this node.

Methods in the Node class delegate to the state methods. For example, the Node.draw( ) method calls the NodeState.drawComponent( )method. By using the state pattern, nodes can change their appearance and behavior on the fly and dynamically. This design can also maintain an abstraction between the unique properties of a specific node and functionality that may be shared by multiple nodes.

Further, the graph framework may contain several customized Effect classes that act on the nodes, updating both the visual appearance of a node and the node's underlying properties (such as the position in the graph). Effects may include the following:

MoveNodeEffect: changes the node's position in the graph using an animation along a straight line.

ScaleNodeEffect: changes the scale of the node while keeping the UICenter on the node's position.

ChangeStateEffect: simultaneously fades out the current node state's appearance while fading in the new node state's appearance. This Effect provides a smooth transition between node states.

FadeEdgesEffect: fades a node, and all of the edges attached to or associated with the node, to a given opacity.

The above Effects are generally used for animating individual nodes within the graph structure. Animating the graph as a whole may be achieved using a Layout class. When a Layout is instantiated for a given Graph, a LayoutState object is created for each node. A LayoutState represents the desired properties of each node at the end of an animation, including its position, size, opacity, and state. After the layout states have been adjusted, the Layout class can use the information to generate an Effect that will simultaneously animate all of the nodes to the desired layout. In some instances, the generated Effect may be built by combining node effects for each of the nodes. A LayoutManager interface may provide methods of programmatically adjusting various layout states, rather than adjusting each layout state individually.

A set of general terms may be used in explaining the multiple levels of nodes and graphs shown in FIG. 3A:

Hub graph: the highest-level graph. The hub graph is a single continuous path from the first query, or initial search terms, to the current refinement.

Hub: a node that is part of the hub graph.

First hub: the most recently clicked hub.

Second hub: the hub clicked previous to the first hub.

Spoke graph: a graph containing the refinement nodes for a specific hub. Each refinement node has a single edge to the spoke graph center.

Spoke graph center: a dummy node (with no visual appearance and no refinement information) used to facilitate drawing an edge to the spoke.

Spoke: a node that is part of the spoke graph and contains refinement information (i.e., all nodes in the spoke graph other than the spoke graph center).

Parent node: In the query/refinement relationship, the query is the parent node of the refinement. The parent node for a spoke will be a hub.

The diagram of FIG. 3A illustrates the nested graph structure. For instance, the various boxes (304, 324, and 320A) of the diagram 300 represent the various containers for the graphs and nodes. The hub graph 304 contains three hubs: A (308A), B (308B), and C (308C). A (308A) is the first hub, and B (308B) is the second hub. The spoke graph for A (320A) comprises five spokes (A1-A5 312A) and a spoke graph center (not pictured). The spoke graph for B (308B) comprises four spokes (B1-B4 312B), while C (308C) has no spokes. The parent node for the five spokes of spoke graph A (320A) is A (308A), the parent node of A (308A) is B (308B), the parent node of B (308B) is C (308C), and C (308C) has no parent node.

In one implementation, C (308C) may represent an initial search term submitted to the search engine, while B (308B) may represent one of the suggested refinements returned with B. After presenting the initial set of suggested refinements for C (308C), some action indicating selection of the suggested refinement represented by B (308B) was made, and the graph structure of 300 was updated, with one or more suggested refinements returned as spokes in a spoke graph for B (308B), and C (308C) being moved down to its parent node status. Further, suggested refinement A (now 308A) may have been selected from among the one or more suggested refinements associated with B (308B). Similar to the previous steps, one or more suggested refinements associated with new center node A (308A) have been returned, and are represented as A1-A5. As illustrated, the second hub—here, B (308B)—retains the listing of its suggested refinements B1-B4 to allow users to select an alternative to currently-selected node A (308A). In some implementations, node C (308C) (as well as any other logically lower nodes) may also include one or more of the previous suggested refinements associated with those terms. In fact, some implementations may allow users to select how many levels of refinements may be shown in a search refinement wheel, while others may require the default value (as illustrated in FIG. 3) to be maintained.

While a nested graph structure may add complexity to the model, the nested structure provides for easy abstraction and may simplify many aspects of the implementation. Advantages of a nested graph structure include:

Drawing: To draw a hub with spokes, the hub adds the spoke graph as a child component of the hub. Node states that do not wish to show the spoke graph do not need to add the spoke graph as a child component.

Performance: The spoke graph generally may be created a single time. For instance, consider if a user continues clicking through a path of suggested refinements, and then returns to the root of the search path (i.e., the first search term(s)). All of the spoke graphs the user encountered along the search path may be retained by or referenced in the nodes (and the corresponding information stored in a cached set of information). If the user clicks down the same path of refinements again, the associated spoke graphs will appear instantaneously based on the cached information, and will not need to be regenerated.

Animation: Since the spoke graph is a child in the hub's container, animations applied to the hub will affect the spoke graph, and thus, the spokes in the spoke graph. A single MoveNodeEffect( ) or ScaleNodeEffect( ) applied to a hub will allow the correct corresponding actions to be performed to the related spokes.

While the nested graph structure may be used in one implementation, an alternative single graph design and structure may also be used in alternative implementations.

The search refinement wheel is implemented on top of the underlying graph framework by extending the Node class to a WWNode class, using special NodeState classes that expressly work with WWNode, and through a particular class associated with the search refinement wheel, represented herein as the WonderWheel class, that exposes functionality between the hub graph and the spoke graphs.

The WWNode class represents both spokes and hubs, as, in most instances, a spoke can generally become a hub, and a hub can become a spoke. In general, the WWNode class extends the Node class as follows:

A String property for the query associated with a WWNode is added.

References to the spoke graph, spoke graph center, parent node, and WonderWheel class are added.

Methods for fetching refinements from a refinement engine or revision server are added, as well as methods for creating the spoke graph.

Methods to call the appropriate scripting functions (such as JavaScript or any other suitable scripting language) on the page to load HTML results for the node's query.

Methods for changing the spoke and hub references, including:

moveSpokeToHubGraph( )—removes the node from the spoke graph that contains it and adds the node to the hub graph. Generally, the visual appearance of the node will not change.

moveNodeToSpokeGraph( )—this method takes a node as a parameter, wherein the parameter node is then deleted from the graph that contains it and is added to the spoke graph of the node that calls the method. Generally, the visual appearance of the parameter node will not change.

Nodes in the search refinement wheel use special node states that take advantage of the additional functionality of WWNode. An abstract class GenericWWNodeState (330 in FIG. 3B) implements many methods common to all node states associated with the search refinement wheel, including the basic visual appearance of a node, the basic look of a node on a mouseover, text-rendering for the query associated with the node, and behavior of the node on the mouseover. Concrete implementations of search refinement wheel node states may override certain methods to achieve their visual appearance. FIG. 3B illustrates examples of node states associated with a generic search refinement wheel.

The behavior of a node when clicked or otherwise activated is handled by the node state's handleClick( )method. The implementations of handleClick( ) contain the core logic of the search refinement wheel. Typically, the handleClick( )method will perform at least one of the following steps:

Manipulate the hub graph, either by adding a new hub or removing hubs.

Perform calls to the moveSpokeToHubGraph( ) and/or moveNodeToSpokeGraph( )methods.

Use the LayoutManager on the graph's Layout to create a new desired graph layout.

Create an animation effect based on the Layout.

Add event listeners that run clean-up code at the end of the animation. In many instances, this may involve a call to the moveNodeToSpokeGraph( )method.

Run the animation effect.

A description of each node state used in one implementation of the search refinement wheel is provided below. The description includes the visual appearance of the node, the functional behavior when the node is clicked, the functional behavior when the user hovers over a node, and the type of node that uses the state.

HubState (332):
used for: the first hub.
appearance: centered black label surrounded by a circle, spoke graph behind the label and the circle.
click behavior: no action.
mouseover behavior: no action.

SecondHubState (336):
used for: the second hub.
appearance: a centered light-blue label surrounded by a circle, spoke graph behind the label and circle.
click behavior: The first hub turns into a spoke of the clicked hub, and all nodes move "up" and change the state so that the clicked hub is now the first hub.
mouseover behavior: no action.

LabelState (348):
used for: the parent node of the second hub.
appearance: centered light-blue label surrounded by a circle, no spoke graph.
click behavior: The first hub moves off the screen and fades away. The second hub turns into a spoke of the clicked hub. All nodes move "up" and change state so that the clicked hub is now the first hub.
mouseover behavior: no action.

NoLabelState (352):
used for: all hubs that are not in the HubState, SecondHubState, or LabelState.
appearance: centered circle with no label. No spoke graph.
click behavior: All hubs preceding the clicked hub, except for the immediate next hub, move off screen and fade away. The immediate next hub turns into a spoke of the clicked hub. All nodes move "up" and change state so that the clicked hub is the first hub.
mouseover behavior: draw a light-blue label surrounded by a circle, no spoke graph. This UI component is drawn at full size, regardless of the scale of the node with this state.

SpokeState (340):
used for: spokes in the spoke graph of the first hub.
appearance: small dark blue label with no circle. No spoke graph. Label touches edge at a corner so that the label extends away from the hub.
click behavior: the clicked spoke turns into the new first hub. All nodes move "down" and change state so that the clicked hub is now the first hub.
mouseover behavior: no action.

SecondSpokeState (344):
  used for: spokes in the spoke graph of the second hub.
  appearance: small light blue label with no circle. No spoke graph. Label touches edge at a corner so that the label extends away from the hub.
  click behavior: The first hub turns into a spoke of the second hub. The clicked spoke turns into the first hub. All other nodes stay the same.
  mouseover behavior: no action.
StopState (356):
  used for: the first hub, when the server returns no refinements.
  appearance: centered light grey label surrounded by a circle. No spoke graph.
  click behavior: none.
  mouseover behavior: no action.

Text labels for the various search refinement wheel nodes are handled by WWLabel. WWLabel extends the TextField class (such as from Adobe's Flex), used in some instances due to its provisions of label dimensions at creation time. WWLabel wraps the text in HTML tags that allow the text to be styled with a stylesheet. WWLabel may also add heuristics to make the labels more aesthetically appealing. WWLabel has two properties for controlling these heuristics:
  maximum characters per line: WWLabel inserts a line break between words when the line becomes longer than a number of characters defined by a maxCharPerLine value.
  last word minimum length: WWLabel will remove a line break from the text if the last line contains a single word whose character length is less than a number of characters defined by a lastWordMinLength value. This requirement may supersede the maxCharPerLine value.

In some implementations, hubs may use a WWLabel with a maxCharPerLine value of 10 and a lastWordMinLength value of 0. These parameters can be used to minimize the length of the longer edge of the label's bounding box, which determines the radius of the circle surrounding the label. Spokes will generally use a maxCharPerLine value of 20 and a lastWordMinLength of 4, which may better suit the horizontal space available for spokes.

The stylesheet used for the labels may be part of the search refinement wheel node states. The stylesheet determines the font, color, size, and style (e.g., plain or bold) of the labels. Further, the stylesheet may also control whether the label is rendered with anti-aliasing. In some instances, no anti-aliasing may be used for the label of the first hub and the spokes of the first hub in order to keep the text crisp at its original size. In some instances, all other hubs and spokes (and in some cases, the first hub and its spokes) may use anti-aliasing to avoid jagged edges as a result of scaling the size of the nodes.

A HubManager class is the LayoutManager that sets the position, size, and state for each hub in the hub graph. The layout properties for each hub are determined by using the hub's index. The index of a particular hub is given by interpreting the hub graph as a list, where the first element in the list is the first hub. Therefore, the first hub has an index of 0, the second hub has an index of 1, and so on. Using the index, the layout for a particular hub is calculated as follows:
  Position:
    index=0: (220, 120)
    index=1: (180, 330)
    index>1: (300+cos(angle)*radius, 500−sin(angle)*radius), where angle increases with the index, and radius decreases as the index increases. This results in a spiral formation for illustrating the earliest of searches in a search path.
  Scale (both x-scale and y-scale): max(0.75^index, 0.25)
  State:
    index=0: Hub State
    index=1: SecondHubState
    index=2: Label State
    index>2: NoLabelState
  Node Removal
    index>40: hub is deleted from search refinement wheel.

The layout for the spokes is performed by the method handleClick( ) in the node state. The method handleClick( ) also performs the layout for nodes that are not part of the hub graph, such as a node that is being changed into a spoke.

A number of additional functions, parameters, settings, and modifications to certain operations may be used to allow the generation and operation of the search refinement wheel. For example, to prevent additional HTTP requests and responses between the web browser and the search server, suggested refinements associated with a search term may be included in the search results returned to the web browser from the search server (and/or search engine). Where the search refinement wheel is implemented in Flash, communication between the web browser and the embedded Flash widget may be controlled using an ExternalInterface class or another interpreter/communication piece. Additional parameters, functions, and methods include:
  cache_.q=a query path cache that maps a query or search term to a query path.
  cache_.r=a refinement cache that maps a query or search term to an array of refinements.
  loadWonderWheel( )=a function indicating a Flash-implemented search refinement wheel to animate to a new state. This function may be called when new search results and refinements are received, as well as when users return to previous queries or search terms in the query (or search) path. This function passes the following parameters to the Flash-implemented search refinement wheel:
    jesr.wwi( )=a function that is called once the search results and search refinement wheel have finished loading. It passes the initial refinements to the Flash application to be rendered.
    jesr.wwr( )=a function called by the search results. This function takes a parameter that populates the refinements cache with the refinements returned for a particular search term or query.
    jesr.wwc( )=a function called by the Flash-implemented application when a user clicks a refinement in the search refinement wheel. The new set of search results and refinements are then loaded into the search refinement wheel.

Figure 4B:
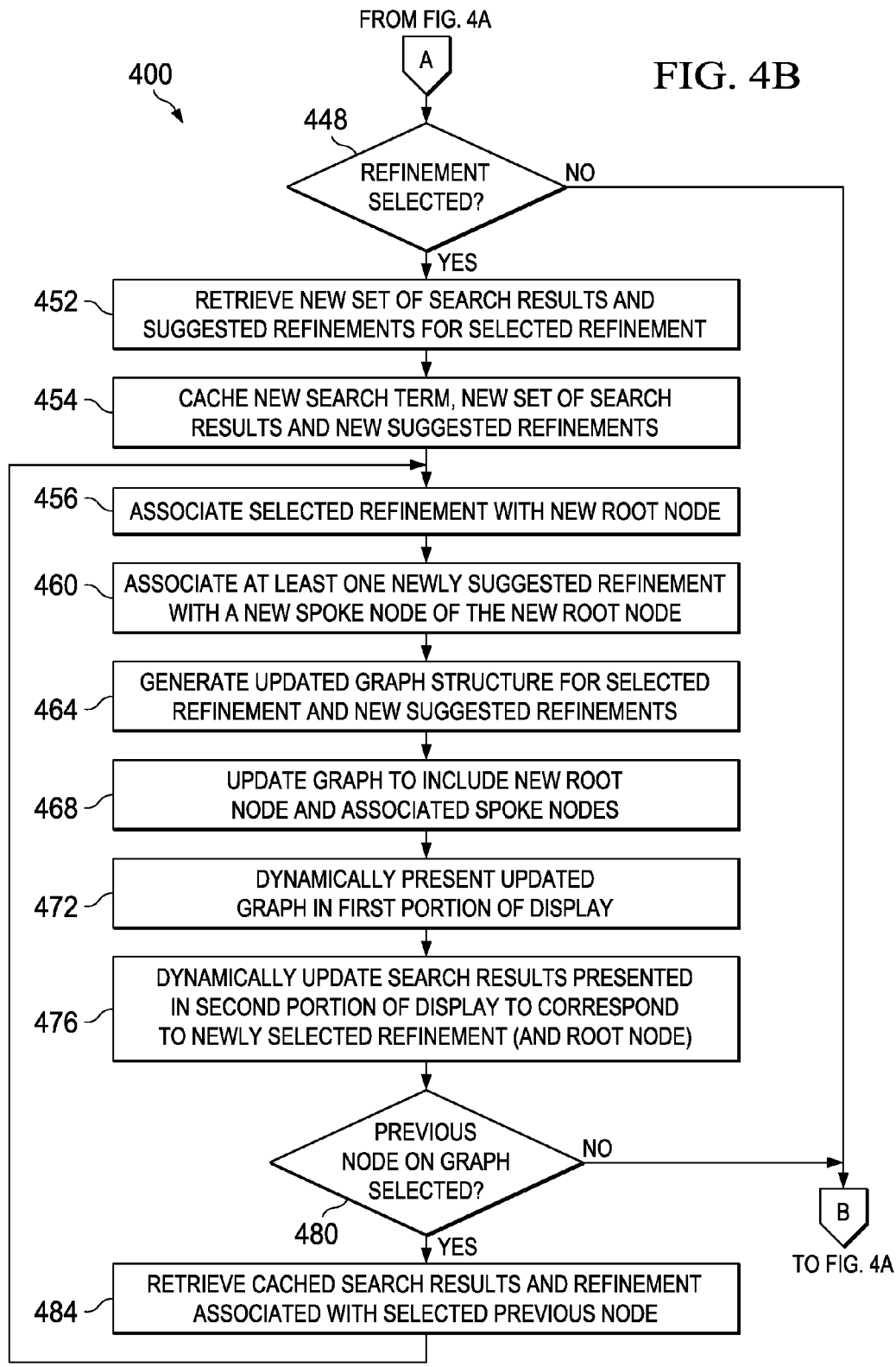
FIG. 4 is a flowchart illustrating a method for presenting search results and refinement suggestions returned from one or more web search queries using a search refinement wheel.

FIG. 4 is a flowchart illustrating a method 400 for presenting search results and refinement suggestions returned from one or more web search queries using a search refinement wheel. For clarity of presentation, the description of method 400 that follows references environment 200 of FIG. 2 for example elements that may perform one or more of the described operations. However, it will be understood that method 400 may be performed, for example, by any other suitable system, environment, or combination of systems and environments as appropriate.

At 404, an initial search term or query is received. In some instances, the initial search term may be received in response to a query submitted by a user at a client, such as client 229, through a web page or interface associated with the underlying search engine. At 406, it is determined whether the search refinement wheel module is activated. If the search refinement wheel module is not activated, then method 400 moves to 408, where the standard search results and search results page are provided to the client. A typical web results page and search experience will be provided, at least until the user activates the search refinement wheel module in order to activate the enhanced search experience. If the search refinement wheel module is activated, method 400 continues at 412. In some instances, the search refinement wheel module may be activated or deactivated by the user through the web page or interface associated with the search engine, such as through an options menu or other search interface UI.

At 412, the search server (or its associated search engine) retrieves one or more search results and at least one suggested refinement for the received search term. As previously described, a search engine may be used to determine the search results for a particular search term, while a refinement engine may be used to determine which refinements to suggest to the user. In some instances, both the search results and suggested refinements may be personalized for the particular user or client that submitted the search term based on a user profile which may include prior searches or other personalization data, thus resulting in unique or targeted results for the user. Once the search results and suggested refinements are retrieved, the search term, search results, and suggested refinements may be cached or stored for later use at 416. Specifically, the search results and suggested refinements may be stored in specific individual caches, a combined cache, or a combination of multiple caches accessible by the search engine, the refinement engine, and/or the client's web browser history. Each set of cached information is also associated with the search term, such that when the search term is again used or selected, the cached information can be retrieved immediately from the caches without requiring a new search, and in instances where the cached information is stored at the client, without requiring additional requests to the server.

At 420, the search server (and/or its search refinement wheel module) begins to generate the graph structure for the display of the search term, retrieved search results, and suggested refinements for the search term. In some instances, the methods and structure defined above with regard to FIGS. 3A-C may be used to generate the appropriate graph structure for the search refinement wheel, while in other instances, any other suitable method or system for generating the graph associated with the search refinement wheel can be used. At 424, the initial (or current) search term is associated with the main node of the first hub, or the root of the graph. In other words, the search term is associated with the primary node displayed in the search refinement wheel graph, and may be delineated as such by its position in the graph structure, the text and shapes associated with the particular node, as well as the search term being displayed in a search term field included in the presented search interface. At 428, at least one of the suggested refinements is associated with a spoke node, where the spoke node is associated with and connected to the root node representing the search term. In some instances, a large number of suggested refinements may be returned by the refinement engine. In such instances, a limited number of suggested refinements (such as those ranking higher according to any suitable or applied ranking algorithm) may be presented or associated with the search refinement wheel. For example, some implementations may limit the number of displayed suggested refinements to the top eight returned refinements, while in other instances, the number of displayed refinements may be higher or lower. In some implementations, the search refinement wheel module may dynamically determine the appropriate number of suggested refinements to include, based on any number of factors, including screen size, potential suggestions returned, user-submitted parameters regarding the number of displayed suggestions, or a set of default parameters.

Once the search refinement wheel structure associated with the initial search term and suggested refinements is generated, the generated graph is presented in a first portion of the corresponding display at 432. In some instances, the first portion of the corresponding display may be located on the left side of a web search results page or other interface, although any portion of the corresponding display may be used to present the search refinement wheel. The current search term is represented as the center node in the spoke graph associated with the initial search, and each of the presented suggested refinements are included as spokes on the spoke graph, with each spoke connected to the center node by an edge (for instance, as drawn by the search refinement wheel module described above). In addition to the search refinement wheel being displayed, the search results associated with the current search term (and center node) are presented in a second portion of the display at 436. In some instances, the second portion of the corresponding display may be located on the right side of a web page or presentation interface, although similar to the search refinement wheel, any suitable portion of the corresponding display may be used to present the search results. In many instances, the presented search refinement wheel and search results may be presented in two parallel columns to allow for easy reference between the search refinement wheel and the current search results. In alternative instances, the search refinement wheel may be presented above the search results in the search results web page or presentation interface, or vice versa. In some implementations, the particular layout of the page may be modified to allow the user to change how the two sets of information are displayed, such as by dragging and dropping UI elements associated with the two portions to various locations within the page.

At 440, the search server determines if one of the responsive search results is selected by the user, such as by activating a hyperlink associated with a particular search result. If it is determined that a search result has been selected, the user can be presented with the page or other web-addressable document associated with the selected search result at 444, generally ending the refinement wheel search experience, although use of the user's browser history may allow the user to return to the search refinement wheel and search results by the browser's "back" (or related) functionality. If no search result is selected, method 400 continues at 448, where it is determined whether one of the presented suggested refinements is selected. If no suggested refinement is selected, method 400 returns to 440 and again determines whether a search result or refinement has been selected. However, if it is determined at 448 that one of the refinements has been selected, method 400 continues at 452.

Once a particular suggested refinement has been selected (at 448), that refinement then becomes the current search term. In response, the search server retrieves new search results and suggested refinements for the newly-selected refinement at 452. Once the new search results and suggested refinements are retrieved, the search engine and refinement engine cache the new search results and suggested refinements at 454, where the results and refinements are now associated with the newly-selected refinement as the search term. Again, by caching the search results and suggested refinements for each search term used, repetitive searching is minimized, allowing the system to quickly access information associated with previously-used search terms.

At 456, the new search term (or the selected refinement) is associated with a new root (or center) node of the first spoke graph in order to redefine the focus of the search refinement wheel. Further, at 460, at least one of the newly retrieved suggested refinements associated with the new search term (or the selected refinement) is associated with a new spoke of the new spoke graph. At 464, method 400 generates an updated graph structure that includes the new spoke graph for the new search term (the selected refinement) and the spokes associated with the newly-suggested refinements.

At 468, the search refinement wheel and its associated graph are updated to include the new structure and information associated with the new root (or center) node (i.e., the new search term) and the associated refinements. In addition, to update the search refinement wheel and its associated graph, the initial search term node and its related refinements are relocated in order to visually reflect the new focus of the search refinement wheel. Depending on the number of searches and levels of refinements selected throughout a particular session, any number of previously-selected search terms and their refinements may be present and located below, or subordinate to, the newly-selected refinement. As previously discussed with regard to FIGS. 3A and 3B, in some instances, various states of previous nodes may be illustrated differently, including limiting information on suggested refinements to only the immediately previous search term's node, and removing the visualization of refinements from other nodes. Various implementations may allow for different levels of visualization according to the particular needs or desires of the particular implementation, as well as based on various parameters and options set by an administrator, the user, or the developer, as well as any other relevant entity.

At 472, the updated graph, including the changes to the various levels of nodes and spoke graphs, are presented in the first portion of the display. In some instances, the changes to the graph may be animated such that a transition from the previous graph to the updated graph is performed through various animations moving the nodes and spokes from their previous positions to their updated positions. Further, explicit changes to various nodes may be limited to the primary, or center nodes, of each spoke graph, while various methods, relationships, and state changes based on those explicit changes can be used to dynamically determine the appropriate changes associated with the dependent nodes, such as the spokes, edges, and other portions of the graph.

Additionally, at 476, the new search results associated with the newly-selected refinement are updated in the second portion of the display to reflect the results for the new search term (i.e., the newly-selected refinement). These results may be updated without the need to refresh the search results page, instead using dynamic programming and display methods to update the search results. In addition to updating the search results themselves, many search engine web interfaces include a search bar displaying the current search term. In addition to updating the search results, method 400 may also update the search term text box to reflect the most recently submitted search term or selected refinement. This update may be performed before, concurrently with, or after updating and presenting the search results at 476.

At 480, method 400 determines whether a previous node or search term within the search refinement wheel graph is selected. If not, method 400 returns to 440, where it is determined whether one of the newly-presented search results have been selected, as well as whether one of the newly-suggested refinements has been selected at 448. After returning to 440, method 400 proceeds in a similar manner as described from 440 through 476, and may continue the cycle any number of times as the search experience continues and remains active. In contrast, if one of the previous search terms or nodes from the search refinement wheel graph is selected, method 400 continues at 484, where the cached search results and suggested refinements associated with the selected search term (from the previously-used node) are retrieved. In some instances, accessing the cache may be performed by searching databases, tables, or arrays associated with previously-used search terms and their associated search results and suggested refinements to determine the sets of information relevant to the currently selected node. In some instances, the cached information may be stored at the client, thus removing the need to send an additional request to the search server (and search engine) for new results and refinements. Once the cached information is retrieved, method 400 returns to 456, where the process of creating the updated search refinement wheel graph based on the previously-used information is performed. While similar to the operations performed while branching out in a new and unsearched path, some of the operations may be different based on the situation. For example, when generating the updated graph, the graph may revert or move to the previous state including the respective cached information. To do so, some of the more recent searches and query paths may be removed from the search refinement wheel in order to reflect the location of the previously selected node. In other words, previously-performed searches that occurred after the currently selected node was selected at 480 may be removed from the illustrated search history in order to reflect the updated focus of the search refinement wheel. In some instances, the generation of the updated search refinement wheel may be based solely on the information stored at a client cache, such as the client's web browser history. Similar other changes to operations based on the return to the previous state may also occur, and will be clear to one skilled in the art.

Although method 400 is illustrated in a particular order, various forms of the flow may be used in any suitable implementation, including adding or subtracting certain operations, as well as performing certain operations in a different order, as well as concurrently with each other. Furthermore, certain operations performed in the example of FIG. 4 may not be used in each implementation of the present disclosure. In general, method 400 of FIG. 4 provides just a single example of operations that can be used to implement the various aspects of the present disclosure.

FIGS. 5A-C are example signaling and flow diagrams illustrating operations performed across a client, a search engine (including a refinement engine), a search refinement wheel module, a search index and a refinement index, and a state cache and a refinement cache (located at the client) associated with presenting search results and suggested refinements in a search refinement wheel in several situations. Specifically, FIG. 5A illustrates example operations 500 for presenting a search refinement wheel after an initial search term is submitted by the client. FIG. 5B illustrates example operations 530 for presenting an updated search refinement wheel when a suggested refinement is selected from a previously presented search refinement wheel. And, finally, FIG. 5C illustrates example operations 560 for updating and presenting the search refinement wheel when a previously-selected node or search term is selected in the previously presented search refinement wheel. As described in FIGS. 5A-C, (1) the search engine and refinement engine and (2) the search index and the refinement index are combined into two elements for the purposes of the example. However, it will be understood that in some implementations, the search engine and the refinement engine may be separate entities, while the search index and the refinement index may also be separated into separate indexes. Similarly, the state cache of FIGS. 5A-C is separate from the illustrated refinement cache, although in some implementations a single cache may be used to store cached information and data regarding both the search results and suggested refinements for the various search terms. While certain operations are illustrated as associated with a particular element, any suitable combination of elements (both illustrated and not shown) may be used to perform the operations described.

Beginning with FIG. 5A, example operations associated with an initial search are illustrated. In FIG. 5A, it is assumed that the search refinement wheel module is activated and being used to generate search refinement wheel instances in response to search queries from users. At box 502, the client submits a search query based on a particular search term or terms to the search engine. In some instances, and as described above with regard to systems 100 and 200, the client may use a web browser communicating and associated with the search engine (via a web interface or web page for the search engine) to send the search query. At box 504, the search engine receives the search query and requests search results for and suggested refinements responsive to the search term(s) from the search and refinement index. At box 506, the search and refinement index identifies a set of search results and refinements associated with the search term(s) and returns those search results and suggested search term refinements to the search engine. At box 508, the search engine stores the returned search results in the state cache, and at box 510 the state cache associates the stored search results with the current search term(s) in order to enable those results to be retrieved at a later date. At box 512 the search engine stores the suggested refinements identified at box 506 in the refinement cache, and at box 514 the refinement cache associates the current suggested refinements stored by the search engine with the current search term(s). In some instances, such as those illustrated in both FIGS. 1 and 2, the state cache and the refinement cache may be located at the client. For example, the search results and suggested refinements identified at box 506 can be stored at the client, so that future searches or selections associated with the current search term, such as those accessed using the "back" capability of the client's web browser, will not require additional requests being sent to the search engine.

At box 516, the search engine sends a request for the preparation of a search refinement wheel instance to the search refinement wheel module. As previously noted, the search refinement wheel module may be a sub-module, agent, or some portion of the search engine such that the request of box 516 is an internal request sent within the search engine. In other instances, the request to generate the search refinement wheel may be a normal response to performing the search engine's functionality, such that no generation request is necessary or performed. In any event, the search refinement wheel module generates a search refinement wheel instance based on the current search term and the suggested refinements (identified at box 506). In some instances, generating the search refinement wheel instance may be performed according to the operations and parameters of the graph framework described above, although any suitable methods, operations, and frameworks for generating the search refinement wheel may be used.

At box 520, the search engine sends the set of search results responsive to the current search term to the client for presentation. At box 524, the search refinement wheel module (which in some instances may be a portion of the search engine) sends the generated search refinement wheel graph to the client for presentation. In some instances, the operations of boxes 520 and 524 may be performed in a reverse order or, in other instances, concurrently such that a single response from the search engine is sent to the client. At box 522, the client presents the search results responsive to the current search term in a first portion of the client's display (or GUI), while at box 526, the client presents the search refinement wheel graph in a second portion of the display. Similar to boxes 520 and 524, the operations of boxes 522 and 526 may be performed in a different order, as well as concurrently, in various implementations. In some instances, the two operations may be performed such that the entire results page is rendered at one time in order to present a unified search page without appearing to be two separate operations. Additionally, the operations of boxes 522 and 526 may be combined into a single operation allowing the two sets of information to be presented together. Although not illustrated, the submitted search term may also be presented in the display in order to indicate the search term upon which the search results and suggestions are based. Once the results and search refinement wheel are presented, a user at the client may continue working with the search refinement wheel or results, such as in the capacity described in FIG. 5B.

As described above, FIG. 5B illustrates example operations for presenting an updated search refinement wheel when a suggested refinement is selected from a previously presented search refinement wheel. In some instances, the operations of FIG. 5B may continue immediately after box 526 of FIG. 5A, while in other instances, the operations of FIG. 5B may begin after multiple searches have already been performed using the search refinement wheel.

At box 532, the client activates a particular suggested refinement node in a presented instance of a search refinement wheel, such as by clicking on one of the spokes of a spoke graph presented in the search refinement wheel. At box 534, the search engine receives the search terms associated with the activated node, and requests new search results based on the search term associated with the activated node from the search and refinement index. At box 536, the search and refinement index identifies a set of new search results and suggested refinements associated with the new search term (associated with the activated node) and returns those results to the search engine. At box 538, the search engine stores the new results in the state cache, and at box 540 the state cache associates the new search results with the new search term. In some instances, this may be performed by adding a row to an existing database or a new entry to a table or array storing the identified results. At box 542, the search engine stores the new suggested refinements in the refinement cache, and at box 544 the refinement cache associates the new suggested refinements with the new search term. As described in FIG. 5A, the state cache and the refinement cache may be located at the client. In alternative instances, the caches may be located at the server associated with the search engine, as well as any other suitable location.

At box 546, the search engine sends a request for the search refinement wheel to be updated based on the newly-received search term and its related search results and suggested refinements. At box 548 the search refinement wheel module performs operations to update the search refinement wheel graph instances based on the new search term and the new suggested refinements. In some instances, updating the search refinement wheel may comprise updating information associated with each set of search terms, including those previously submitted, in order to notify the system of the change in priority or state of the various nodes. For example, an index identifier for each search term node may be increased by one, signifying a change in the particular state of each node. Based on the node change, the associations between those nodes and their suggested refinements may be updated, including information on whether any of the suggested refinements for the previous nodes should be presented in the updated graph. Various methods, parameters, and states associated with the search refinement wheel have been described above, although any suitable methods and parameters may be used instead. In any event, the search refinement wheel module ensures that the newly-selected refinement (and current search term) is or will be the root (or center) node of the current search refinement wheel, modifying the previous search terms and nodes accordingly.

At box 550, the set of new search results associated with the new search term are provided to the client by the search engine, which may present the new search results in the first portion of the display, thus replacing any previous search results presented in the search engine web interface or other page displaying the search results at box 552. Further, at box 554 the search refinement wheel module sends the generated search refinement wheel graph (or information defining how the updated graph should be presented) to the client. At box 556, the client receives the information defining the new search refinement wheel graph, and any related processing of that information is performed. At box 558, the client animates the transition of the search refinement wheel from the previous search refinement wheel graph into the updated search refinement wheel graph with the focus on the search term activated in box 532. The animation and layout changes may be based upon the techniques described above, although any suitable methods for presenting the updated search refinement wheel may be used. Further, in some instances, the change from the previous search refinement wheel to the current search refinement wheel may not include any animation, and may instead exchange the updated graph structure for the previous graph structure. In general, however, the updated search refinement wheel graph structure can present the current search term and a set of suggested search refinements thereto, as well as a graphical view of the search or query path describing how the current search term was reached.

FIG. 5C illustrates example operations for updating and presenting the search refinement wheel when a previously-selected node or search term is selected in the search refinement wheel. For instance, this situation may occur when a previous search term's node is selected by the user in order to return to a previous location within the search history, thus backtracking to return to a previous portion of the search path. In some instances, returning to a previous search term may be based on a desire to follow a different search path than selected at some point, or to try another path as the search experience continues. Further, such an action may be performed by activating a previous search term node within the presented search refinement wheel, or by manually selecting a previous location in the client's browser history, either by using the "back" functionality of the browser, or by specifically identifying a location within the browser history. In many instances, the state cache and refinement cache may be present at the client. Thus, when a user at the client clicks or activates a previous refinement, the cached data is loaded from the two caches, thus making it unnecessary to retrieve additional search and refinement information from the search server and search engine. In general, this structure makes the process of browsing refinements much more responsive when returning to a previous search. Various implementations of the present disclosure may provide any suitable structure, including one or more of the caches being located at the search server or locations other than the client. For instance, some mobile clients (i.e., smartphones, netbooks, and other relevant devices) may store the cached information at the search server or otherwise apart from the mobile client itself in order to optimize device performance while still providing the functionality of the search refinement wheel in the search experience.

At box 562 the user at a client navigates back to or selects a previous search term node from the search refinement wheel or browser history. At box 564, the client identifies the newly selected or identified node as being associated with a previously-used or selected search term. By identifying the node as such, the client may refrain from sending a new request to the search engine that would duplicate previous search results and suggested refinements. In some instances, the selected search term is compared with the browser history in order to identify the selected node or search term as a previously-searched term in the current search experience. Then, at boxes 566 and 568, the client retrieves a set of cached search results associated with the search term or node selected at box 562 from the state cache. Additionally, at boxes 570 and 572, the client retrieves the refinements associated with the selected search term or node from the refinement cache. As previously discussed, the data stored in the various caches is generally associated with the corresponding search term to allow for easy and manageable linking of cached data and selected search terms.

At box 574, the client presents the cached search results for the newly-identified (but previously searched) search term in the first portion of the search result web interface. Because the information is cached at the client, generally little to no interaction with the search engine is required to present the corresponding search results. At box 576, the client requests an updated search refinement wheel based on the cached information retrieved at boxes 566 and 570. In some instances, including that illustrated in FIG. 5C, the request for an updated search refinement wheel may include a request to the search refinement wheel module. As previously described, the search refinement wheel module may be located at the server, although in some instances, the search refinement wheel module may be located at the client in order to remove any need to send requests to the server during the current scenario. In still other instances, no call to the search refinement wheel module may be necessary, as the particular graph structure and refinements may be cached at the client during previous iterations, such that the updated instance of the search refinement wheel is retrieved from a relevant client-side cache along with the search results and suggested refinements. Returning to the illustrated instance, at box 578 the search refinement wheel module (whether on the client, at the server, or elsewhere) updates the search refinement wheel graph based on the search term selected at box 562 and the search results and suggested refinements returned from the various caches at boxes 566-572. Once the updated search refinement graph is generated, the search refinement wheel graph is returned to the client at box 580. At box 582, the client receives the information defining the updated search refinement wheel graph, performs any additional processing to place the graph into a compatible and presentable format, and presents (or animates) that transition from the immediately prior search refinement wheel graph to the updated search refinement wheel graph in the second portion of the display.

Figure 6A:
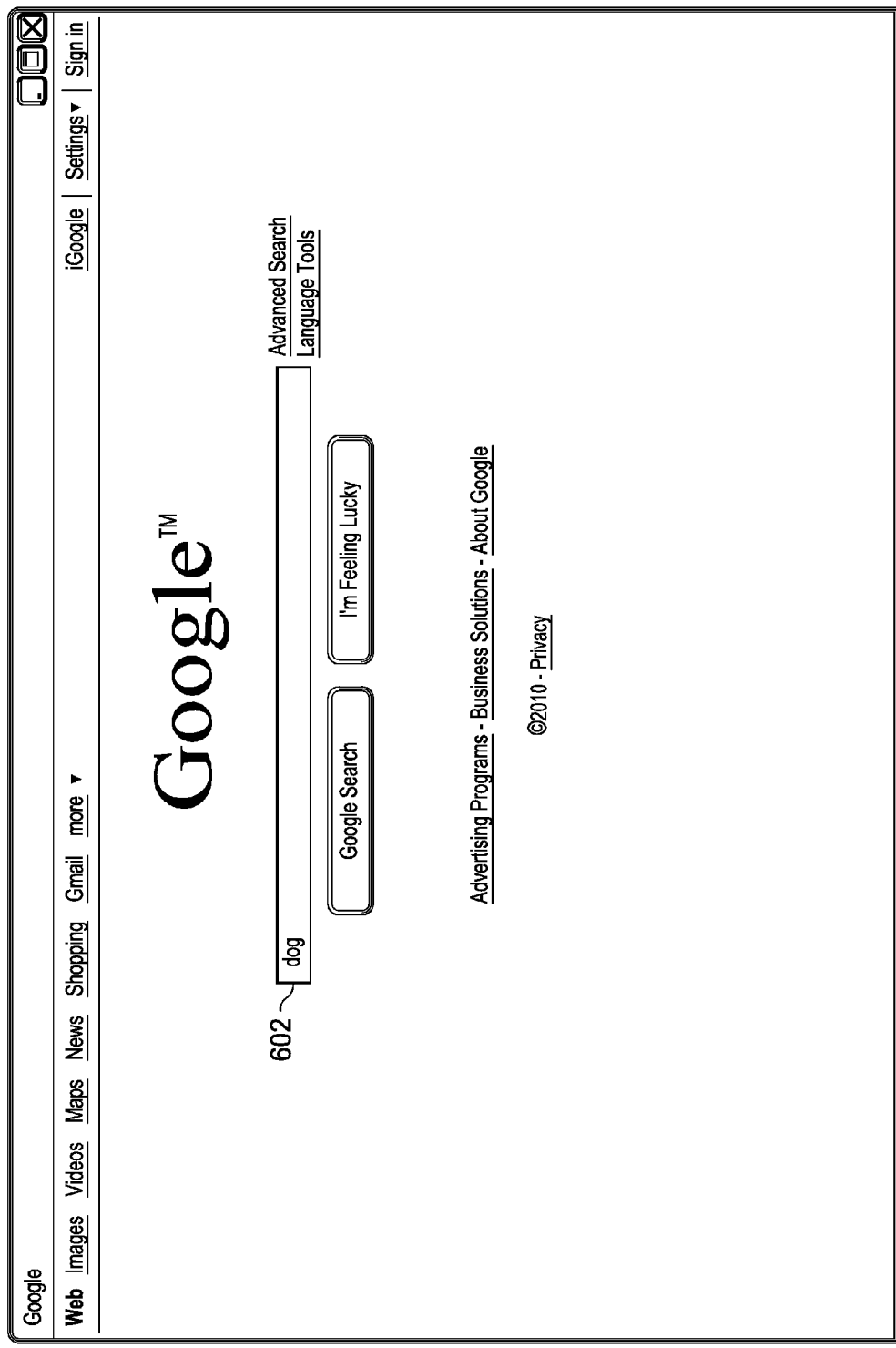
FIGS. 6A-F are screenshots illustrating an example progression of interactions through several iterations of searching using an instance of a search refinement wheel.
Figure 6B:
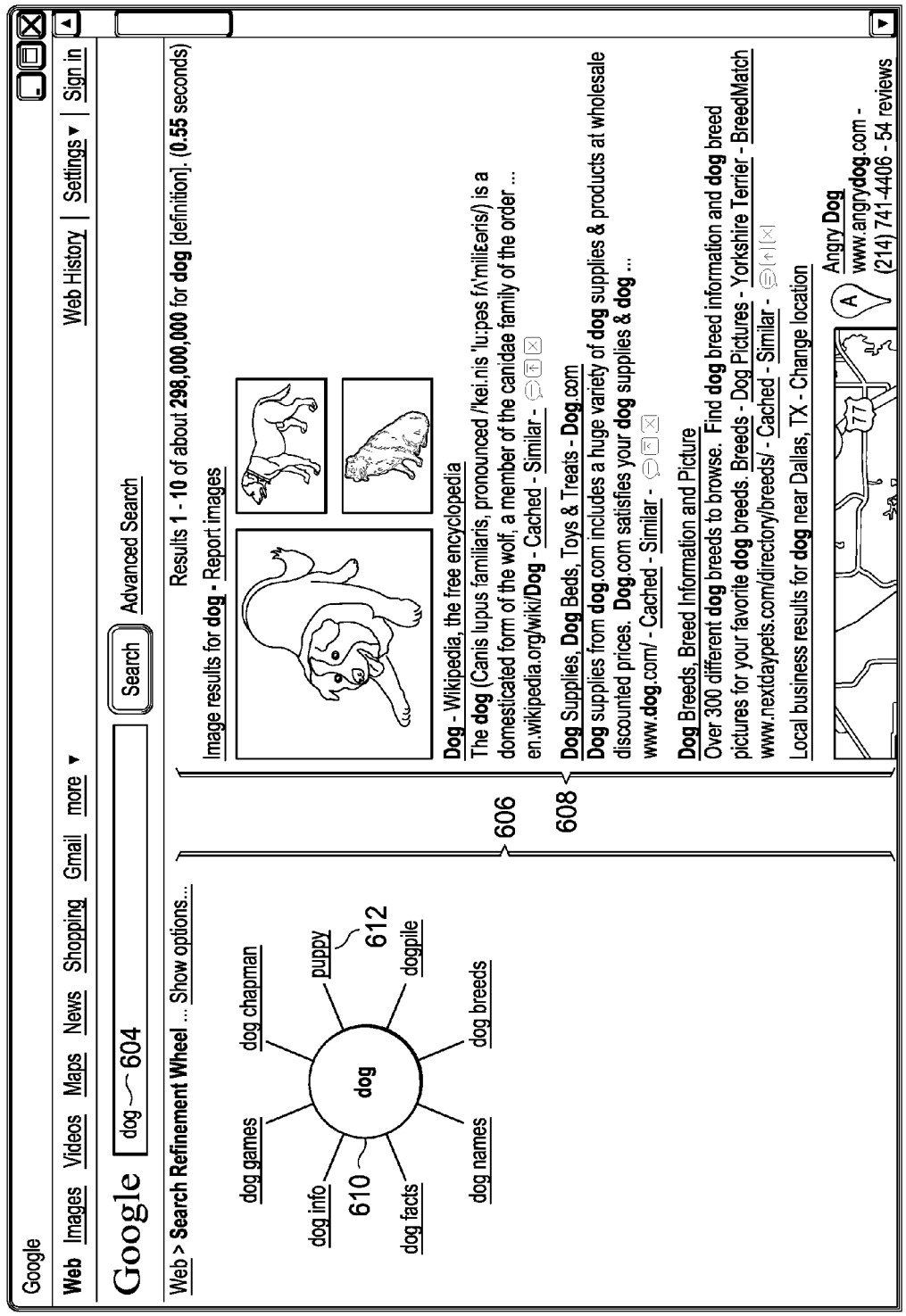

FIGS. 6A-F illustrate an example progression of screens, search refinement wheels, and search results during a search experience, beginning with an initial search engine web interface and continuing through a number of search queries based on the initial search term. FIG. 6A illustrates the web page 600 associated with the Google™ search engine. As shown, the word "dog" is entered into search term field 602 as the initial search term, and the search is initiated. Next, FIG. 6B illustrates a set of initial search results 608 and a search refinement wheel 606 including the suggested refinements for the initial search of the word "dog." In this instance, the presented search results 608 are those responsive to the search term "dog," and include hyperlinks to various web pages, documents, and other media (including images) returned based on the search. With regard to the search refinement wheel 606, the search term "dog" is represented as the center node 610 (or first hub) in the illustrated graph. Additionally, eight different suggested refinements are identified as spokes to the first hub containing the search term "dog," including the suggested refinement of "puppy" 612. In the current example, the user selects the suggested refinement of "puppy" 612 by clicking on the corresponding link. Each of the illustrated spokes are associated with the search term corresponding to its label, such that clicking on the refinement will make the associated label of the refinement as the new search term.

Figure 6C:
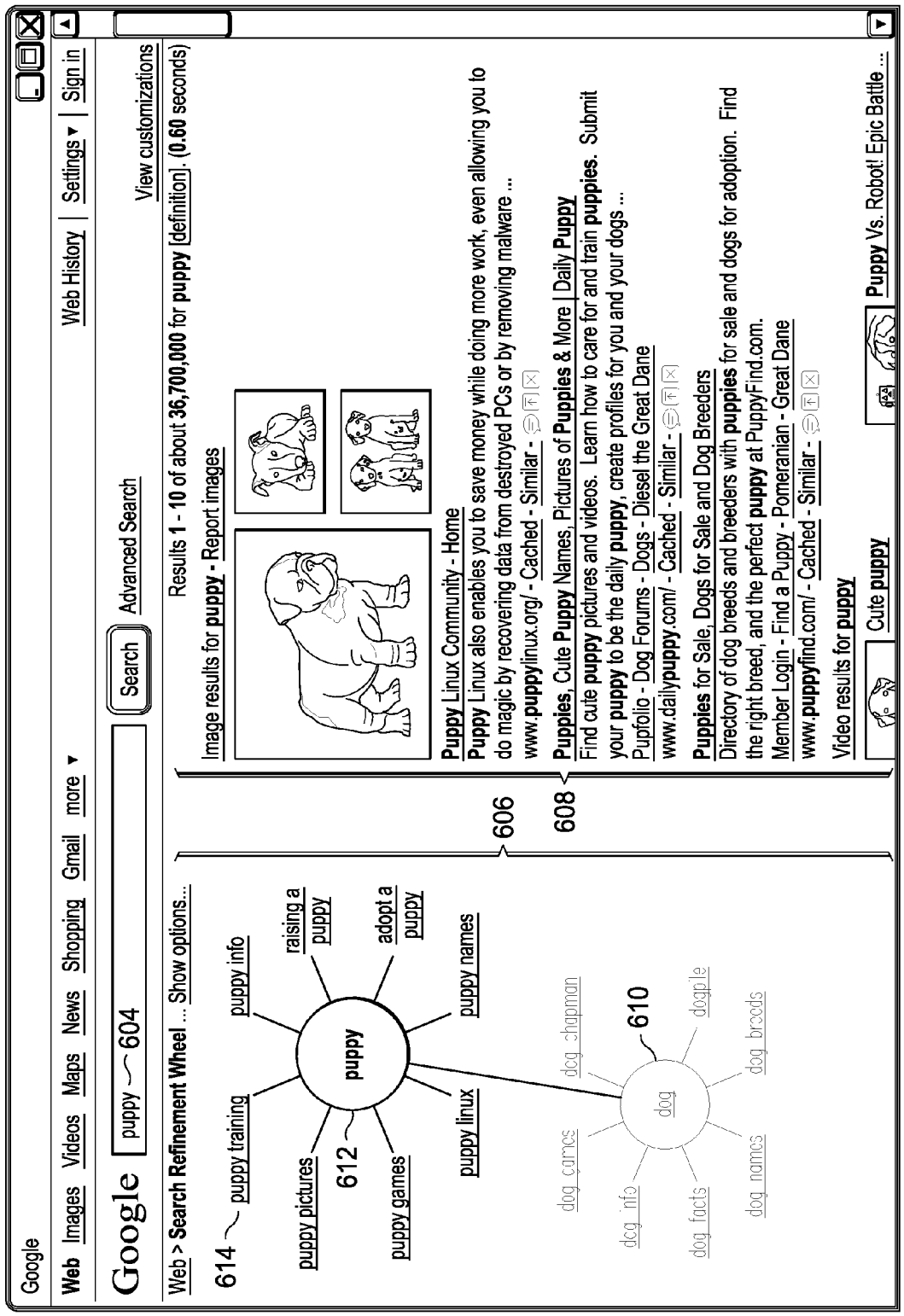

FIG. 6C illustrates the updated search results page after the suggested refinement of "puppy" 612 is selected. The "puppy" refinement is now represented as the "puppy" search term, both in the search term text box 604 and in the new center (or first hub) node 612 in the primary portion of the illustrated search refinement wheel 606. As the new search term, the "puppy" node 612 now includes eight suggested refinements of its own, including the suggested refinement of "puppy training" 614. Additionally, a new set of search results 608 responsive to the search term of "puppy" are presented in the right section of the search results page. Further, the previous node of "dog" 610 has been moved to the second hub, or the hub clicked previous to the new first hub. The "dog" node 610 still includes its set of refinements other than the previously selected "puppy" refinement 612. A line, or edge between the "dog" node 610 and the "puppy" node 612 illustrates the relationship within the search history of the two nodes, indicating that the "dog" node 610 is the parent of the "puppy" node 612. In one implementation, the change from the search refinement wheel of FIG. 6B to FIG. 6C may be performed through an animation controlled by a search refinement wheel module such that the transition appears seamless to the user. Additionally, the search results 608 may be dynamically changed within the current page, removing the need to refresh the current search results page or navigate to a new search results page.

Figure 6D:
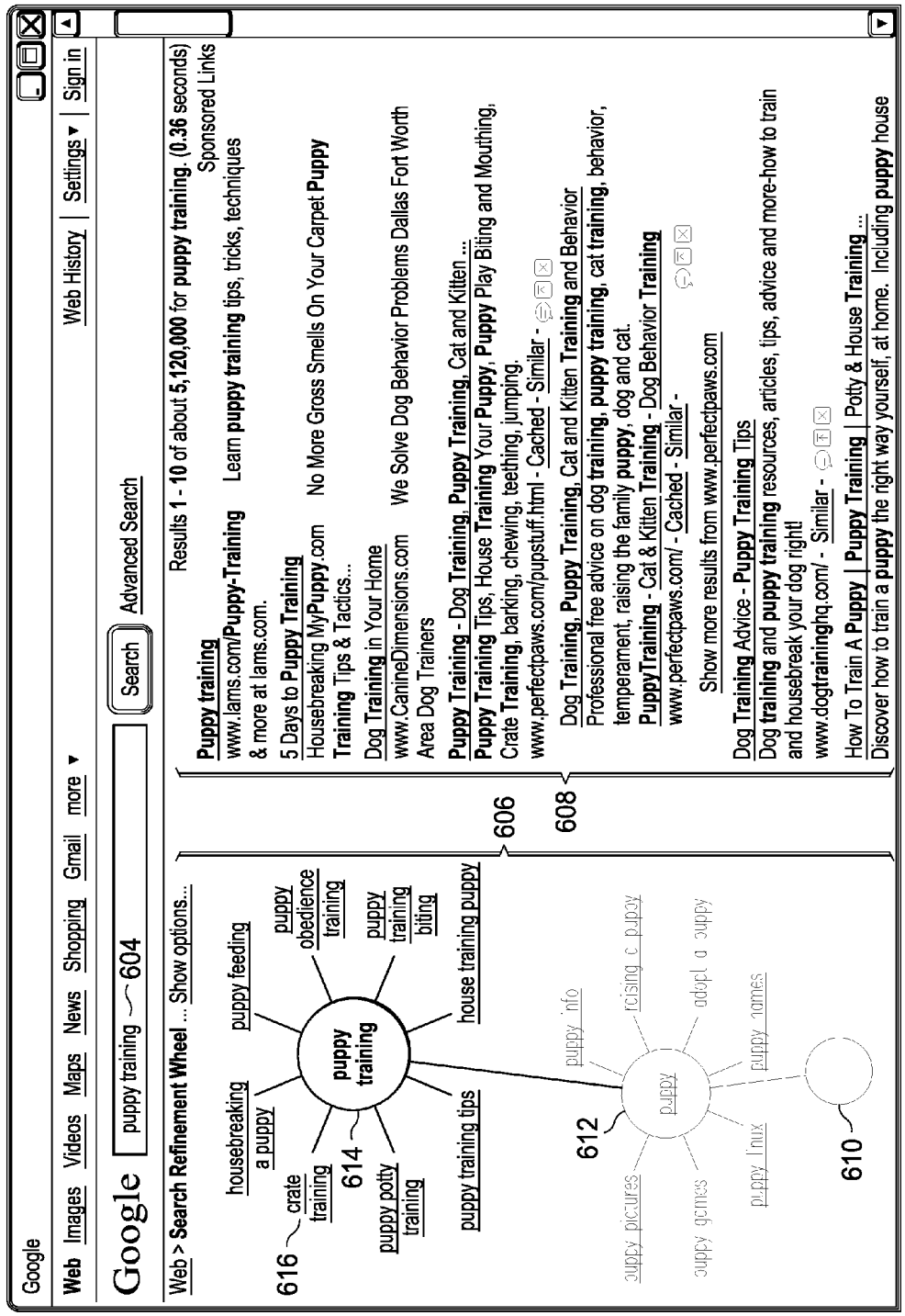

FIG. 6D illustrates the updated search results page when a new suggested refinement is selected. In this instance, the "puppy training" refinement of FIG. 6C was selected by the user. The search term "puppy training" is now represented as the first hub node 614 in the search refinement wheel, in the search term text box 604 as the current search, and by the search results 608 responsive to the search term "puppy training." As before, the new first hub node of "puppy training" 614 includes eight new suggested refinements, including the term "crate training" 616. The previous first hub node of "puppy" 612 has been moved to the second hub, while the "dog" node 610 has been moved down in the updated graph to a node without its suggested refinements or a corresponding label. In some instances, a mouseover of the "dog" node 610 will present the label "dog" while the mouse hovers over the node 610. The edge between the "dog" node 610 and the "puppy" node 612 remains, while the edge between the "puppy" node 612 and "puppy training" node 614 provides an indication of the relationship between the two. Specifically, the "dog" node 610 is the parent of the "puppy" node 612, and the "puppy" node 612 is the parent of the "puppy training" node 614. Again, in some instances the transition from the search refinement wheel of FIG. 6C to the search refinement wheel of FIG. 6D may be animated in order to illustrate and present the relevant changes when new node or refinement is selected.

Figure 6E:
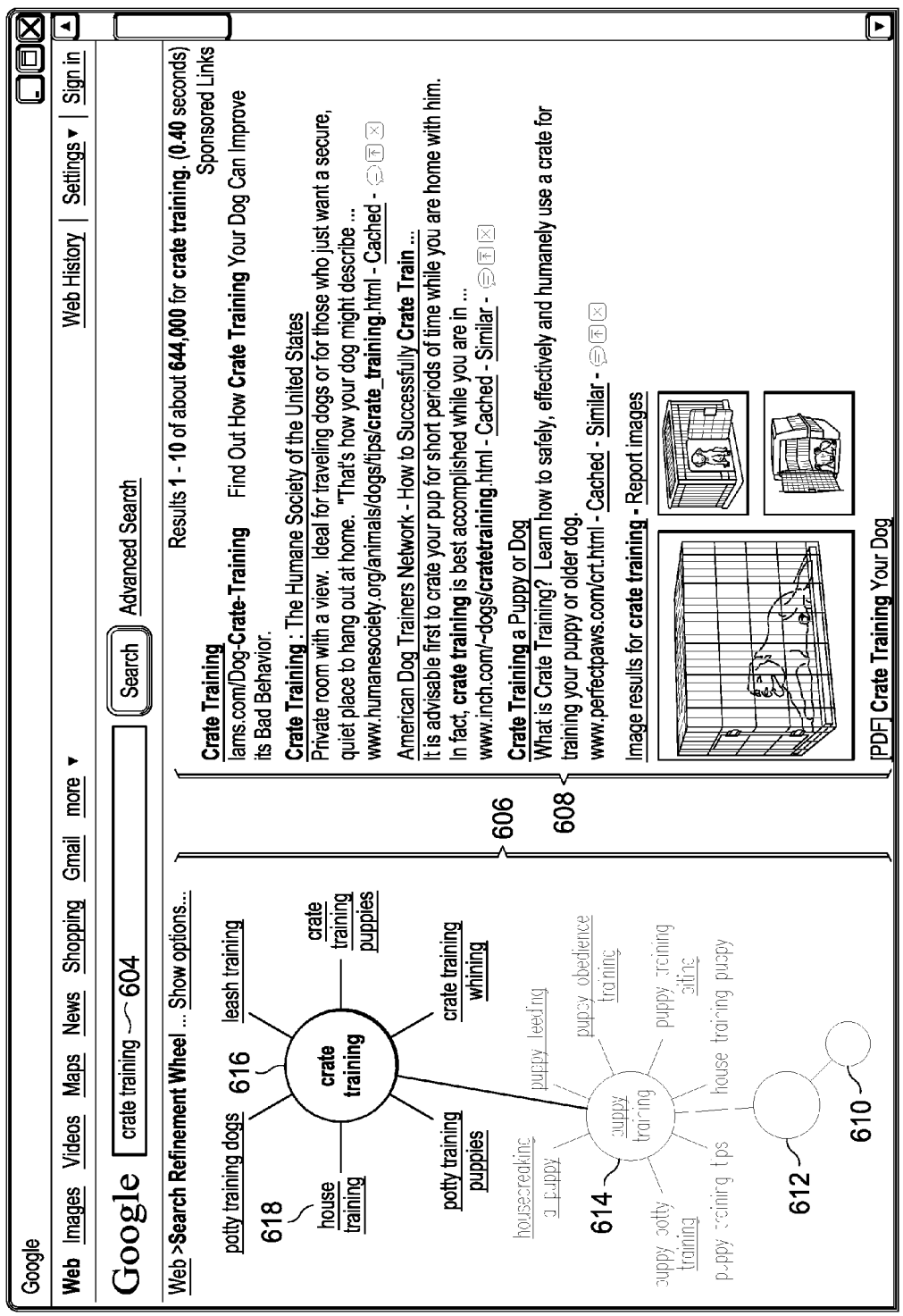

FIG. 6E illustrates the updated search results page when the suggested refinement of "crate training" 616 of FIG. 6D is selected by the user. The search term "crate training" 616 is now represented in the first hub node, in the search term text box 604, and by the search results 608 responsive to the term "crate training." The "crate training" first hub node 616 includes six suggested refinements, including the suggested refinement of "house training" 618. As also illustrated, the "puppy training" node 614 has moved to the second hub, with now both the "puppy" node 612 and the "dog" node 610 have been moved to the lower portion of the search refinement wheel without suggested refinements or label.

Figure 6F:
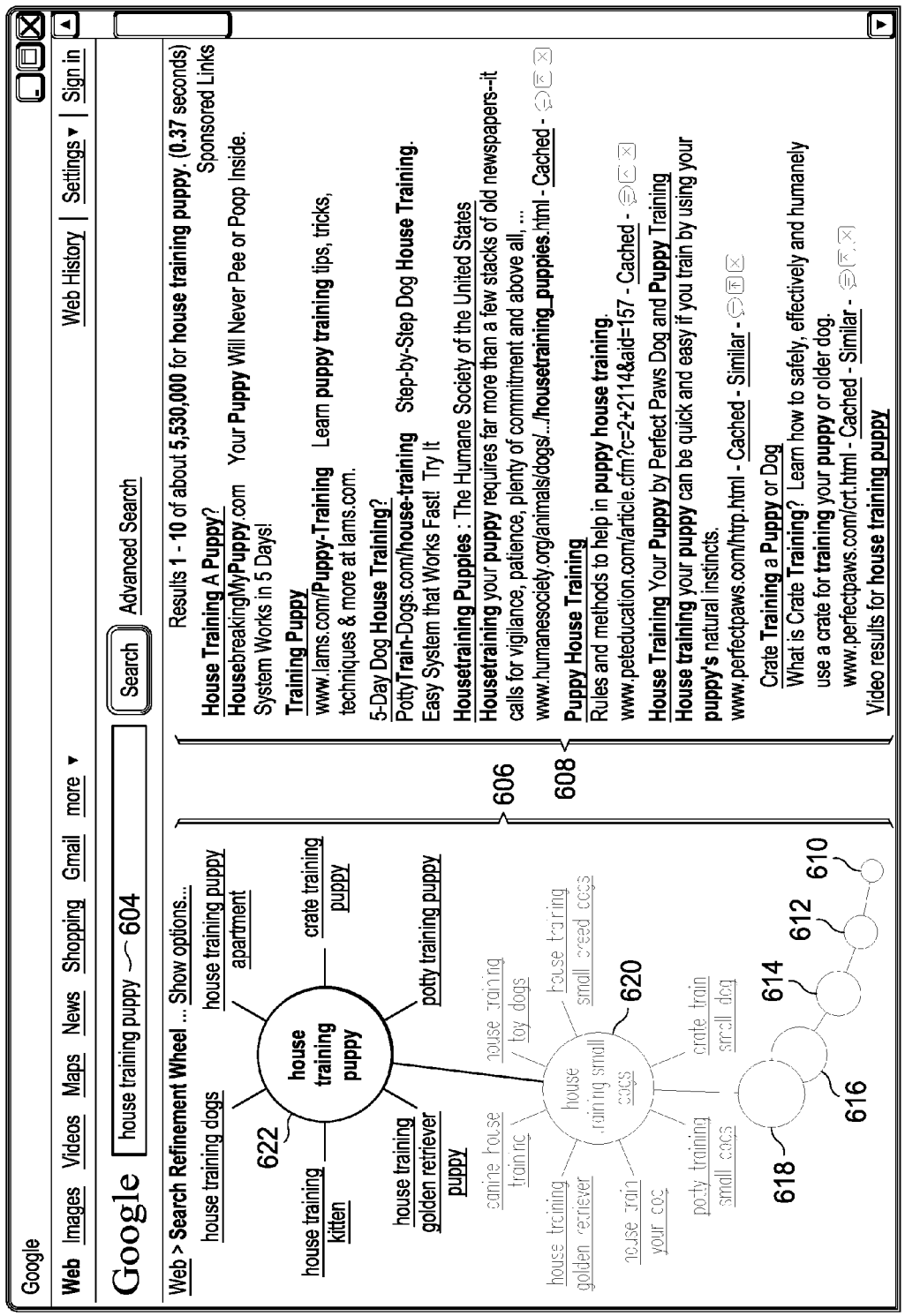

FIG. 6F illustrates the updated search results page after three additional suggested refinements have been selected, such that the new first hub node is "house training puppy" 622, which was derived from the search term "house training small dogs" 620, which in turn was derived from the "house training" search term 618 (and previous suggested refinement of "crate training" 616) in FIG. 6E. The nodes for "house training" 618, "crate training" 616, "puppy training" 614, "puppy" 612, and "dog" 610 are all moved to the lower portion of the search refinement wheel 606 without suggested refinements or labels, and illustrating the previous search terms in a spiral formation.

While not illustrated in FIGS. 6A-F, it is understood that a user may want to return to a previous search term in the search history. For instance, from FIG. 6F, the user may select the "puppy training" node 614. In such an instance, the search engine can retrieve the previous search results and suggested refinements associated with the search term "puppy training," as well as the states of the other nodes prior to the "puppy training" node 614. Using the cached information, the search results page would return to the illustrated search refinement wheel 606 of FIG. 6D, presenting the information in a manner (in many cases) identical to that previously presented. Still further, any number of searches may be performed using the search refinement wheel 606, with the list of nodes continuing to spiral as additional terms are selected.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device can be a machine-readable storage device, a machine-readable storage substrate, a memory device, or a combination of one or more of them.

The terms "processor" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of any invention or of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Still further, although refinements are generally discussed throughout the present disclosure as suggested queries or search terms, alternative refinements may also be provided. For instance, one or more of the suggested refinements may include a refinement comprising a picture, image, or other figure associated with the corresponding search term. One example of such an instance may be if a user searches for celebrities or other types of people, including specific jobs, sports teams, or the like, such that an image of a suggested refinement may be provided at one of the spokes of the search refinement wheel. Images may also be included with or presented in combination with a particular suggested refinement. By doing so, additional visual context may be provided to the user in order to illustrate the particular suggested refinement. Any appropriate algorithm may be used to both incorporate images into the suggested refinements, as well as to determine when an image is to be presented.

What is claimed is:

1. A computer-implemented method:

receiving a first search query;

obtaining a first set of search query refinements based on the first search query;

generating a first spoke graph structure processable to present a visual representation of the first search query and at least a portion of the first set of search query refinements, the first search query being represented by a first node in the visual representation and each portion of the first set of search query refinements represented by an individual spoke in the visual representation, wherein each of the individual spokes in the visual representation is associated with a link corresponding to a new search query based on a corresponding search query refinement;

providing the first spoke graph structure for presentation in response to the first search query;

receiving an indication that one of the links associated with a particular individual spoke associated with the corresponding search query refinement from the visual representation of the first spoke graph structure is selected by a user, wherein the selected search query refinement corresponds to a second search query;

obtaining a second set of search query refinements based on the second search query;

generating a second spoke graph structure processable to present a visual representation of the second search query and at least a portion of the second set of search query refinements based on the second search query, the second search query being represented by a second node in the visual representation of the second spoke graph structure and each portion of the second set of search query refinements represented by an individual spoke in the visual representation of the second graph structure, wherein each of the individual spokes in the visual representation of the second spoke graph structure is associated with a link corresponding to a new search query based on a corresponding search query refinement; and providing the second spoke graph structure for presentation in response to the selection of the individual spoke, wherein the second spoke graph structure is to be presented adjacent to an updated version of the first spoke graph structure wherein the particular individual spoke associated with the corresponding search query refinement selected by the user is removed from the first spoke graph structure, and wherein providing the second spoke graph structure for presentation comprises combining the updated version of the first spoke graph structure with the second spoke graph structure into a consolidated spoke graph structure, where the visual representation of the consolidated spoke graph structure presents the visual representation of the updated version of the first spoke graph structure connected to the visual representation of the second spoke graph structure by an edge between the first node of the updated version of the first spoke graph structure and the second node of the second spoke graph structure, and further wherein providing the second spoke graph structure for presentation comprises providing the consolidated spoke graph structure for presentation.

2. The method of claim 1, wherein the first node corresponds to a node at the center of the visual representation of the generated spoke graph structure, and further wherein each of the individual spokes is connected to the first node by an edge in the visual representation of the generated spoke graph structure.

3. The method of claim 1, wherein the visual representation of the consolidated spoke graph structure is presented through an animated transition from the visual representation of the first spoke graph structure to the visual representation of the consolidated spoke graph structure.

4. The method of claim 1, wherein the first spoke graph structure is included in a first portion of a search results web page, and wherein activating the link associated with a particular one of the individual spokes in the visual representation of the first spoke graph structure is operable to submit a second search query based on the corresponding search query refinement, the method further comprising:

obtaining a set of first search results responsive to the first search query; and including the set of first search results responsive to the first search query in a second portion of the search results web page in response to the first search query.

5. The method of claim 4, wherein the first portion of the search results web page is in a position parallel to the second portion of the search results web page.

6. The method of claim 4, wherein obtaining the set of first search results responsive to the first search query and the set of first search query refinements based on the first search query further comprises:

storing the obtained set of first search results responsive to the first search query in a state cache; and storing the set of first search query refinements in a refinement cache; and further wherein the stored set of first search results and the stored set of first search query refinements are associated with the first search query.

7. The method of claim 6, wherein the state cache includes a cache stored at a client device from which the first search query is received and to which the first spoke graph structure is provided.

8. The method of claim 7, wherein the refinement cache includes a cache stored at a client device from which the first search query is received and to which the first spoke graph structure is provided.

9. The method of claim 1, wherein obtaining the set of first search query refinements based on the first search query includes:

identifying a plurality of suggested refinements associated with the first search query;

prioritizing the plurality of suggested refinements associated with the first search query;

determining a subset of the suggested refinements representing at least a portion of the first search query refinements to be included in the set of first search query refinements; and providing the determined subset of the suggested refinements as the set of first search query refinements.

10. An article comprising a computer-readable storage device, the computer readable storage device comprising instructions for causing one or more processors to perform operations comprising:

receiving a first search query;

obtaining a first set of suggested search query refinements responsive to the first search query; and generating a first spoke graph structure processable to present a visual representation of the first search query and at least a portion of the first set of suggested search query refinements, the first search query being represented by a first node in the visual representation and the portion of the first set of suggested search query refinements represented by an individual spoke in the visual representation, wherein each of the individual spokes in the visual representation is associated with a link corresponding to a new search query based on a corresponding search query refinement;

providing the first spoke graph structure for presentation in response to the first search query;

receiving an indication that one of the links associated with a particular individual spoke associated with the corresponding search query refinement from the visual representation of the first spoke graph structure is selected by a user, wherein the selected search query refinement corresponds to a second search query;

obtaining a second set of search query refinements based on the second search query;

generating a second spoke graph structure processable to present a visual representation of the second search query and at least a portion of the second set of search query refinements based on the second search query, the second search query being represented by a second node in the visual representation of the second spoke graph structure and each portion of the second set of search query refinements represented by an individual spoke in the visual representation of the second graph structure, wherein each of the individual spokes in the visual representation of the second spoke graph structure is associated with a link for submitting a new search query based on a corresponding search query refinement, and wherein activating the link associated with the individual spokes in the visual representation of the second spoke graph structure is operable to submit a second search query based on the corresponding search query refinement; and providing the second spoke graph structure for presentation in response to the selection of the individual spoke, wherein the second spoke graph structure is to be presented adjacent to an updated version of the first spoke graph structure, wherein the particular individual spoke associated with the corresponding search query refinement selected by the user is removed from the first spoke graph structure, and wherein providing the second spoke graph structure for presentation comprises combining the updated version of the first spoke graph structure with the second spoke graph structure into a consolidated spoke graph structure, where the visual representation of the consolidated spoke graph structure presents the visual representation of the updated version of the first spoke graph structure connected to the visual representation of the second spoke graph structure by an edge between the first node of the updated version of the first spoke graph structure and the second node of the second spoke graph structure, and further wherein providing the second spoke graph structure for presentation comprises providing the consolidated spoke graph structure for presentation.

11. The article of claim 10, wherein the first node corresponds to a node at the center of the visual representation of the generated spoke graph structure, and further wherein each of the individual spokes is connected to the first node by an edge in the visual representation of the generated spoke graph structure.

12. The article of claim 10, wherein the first search query is received from a remote client device.

13. The article of claim 12, the instructions further causing one or more processors to perform operations comprising sending the generated first spoke graph structure to the client device in response to the first search query.

14. The article of claim 10, wherein providing the consolidated spoke graph structure for presentation includes providing for presentation an animated transition from the visual representation of the first spoke graph structure to the visual representation of the consolidated spoke graph structure.

15. The article of claim 10, wherein activating the link associated with a particular one of the individual spokes in the visual representation of the first spoke graph is operable to submit a second search query based on the corresponding search query refinement, the instructions further causing one or more processors to perform operations comprising:

obtaining a set of search results in response to the first search query, and wherein obtaining the set of search results responsive to the first search query and the first set of search query refinements based on the search query further comprises:

storing the obtained set of search results responsive to the first search query in a state cache; and storing the first set of search query refinements in a refinement cache; and further wherein the stored set of search results and the stored set of search query refinements are associated with the first search query.

16. The article of claim 15, wherein the state cache comprises a cache stored at a remote client device.

17. The article of claim 15, wherein the refinement cache comprises a cache stored at a remote client device.

18. A system comprising:

one or more search engine servers adapted to obtain search results associated with a first search query;

one or more search refinement servers adapted to obtain a first set of suggested refinements associated with the first search query; and one or more search results servers adapted to:

generate a first spoke graph structure processable to present a visual representation of the first search query and at least a portion of the first set of suggested refinements associated with the first search query, the first search query represented by a first node in the visual representation and the portion of the first set of suggested search query refinements represented by an individual spoke in the visual representation, wherein each of the individual spokes in the visual representation is associated with a link corresponding to a new search query based on a corresponding search query refinement;

the one or more search engine servers further adapted to receive an indication that one of the links associated with a particular individual spoke associated with the corresponding search query refinement from a presented visual representation of the first spoke graph structure is selected by a user, wherein the selected search query refinement corresponds to a second search query, the one or more search engine servers further adapted to obtain a second set of search query refinements based on the second search query;

the one or more search refinement servers further adapted to obtain a second set of suggested refinements associated with the first search query; and the one or more search results servers further adapted to:
provide the second spoke graph structure processable to present a visual representation of the second search query and at least a portion of the second set of search query refinements based on the second search query, the second search query being represented by a second node in the visual representation of the second spoke graph structure and each portion of the second set of search query refinements represented by an individual spoke in the visual representation of the second graph structure, wherein each of the individual spokes in the visual representation of the second spoke graph structure is associated with a link corresponding to a new search query based on a corresponding search query refinement; and provide the second spoke graph structure for presentation in response to the selection of the individual spoke, wherein the second spoke graph structure is to be presented adjacent to an updated version of the first spoke graph structure where the updated version of the first spoke structure removes the particular individual spoke associated with the search query refinement selected by the user from the previously generated first spoke structure, and wherein the updated version of the first spoke graph structure is connected to the second spoke graph structure by an edge between the first node of the updated version of the first spoke graph structure and the second node of the second spoke graph structure, and wherein providing the second spoke graph structure for presentation comprises combining the updated version of the first spoke graph structure with the second spoke graph structure into a consolidated spoke graph structure, where the visual representation of the consolidated spoke graph structure presents the visual representation of the updated version of the first spoke graph structure connected to the visual representation of the second spoke graph structure by an edge between the first node of the updated version of the first spoke graph structure and the second node of the second spoke graph structure, and further wherein providing the second spoke graph structure for presentation comprises providing the consolidated spoke graph structure for presentation.

19. The system of claim 18, wherein the one or more search refinement servers are further adapted to:
prioritize the first set of suggested refinements associated with the particular first search query;
determine a subset of the first set of suggested refinements representing at least a portion of the first set of search query refinements to be provided to the one or more search servers based on the prioritization of the first set of suggested refinements; and
communicate the subset of the first set of suggested refinements to the one or more search results servers.

20. The system of claim 18, the one or more search results servers further adapted to transmit the generated first and second spoke graph structures to a client device.

21. The system of claim 20, the client device adapted to:
present the visual representation of the generated first and second spoke graph structures on a graphical user interface of the client device; and
receive a selection of one of the individual spokes in the visual representation of the first spoke graph structure through the graphical user interface from a user associated with the client device, the selection indicating a new search query associated with at least one suggested refinement corresponding to the selected individual spoke, wherein the received selection corresponds to a received indication at the search engine server.

22. The system of claim 20, wherein the one or more search results servers are adapted to transmit the search results to the client device and the client device includes a state cache adapted to store the transmitted search results.

23. The system of claim 20, wherein the one or more search results servers are adapted to transmit at least the portion of the first set of suggested search query refinements to the client device and the client device includes a refinement cache adapted to store the transmitted first suggested search query refinements.

* * * * *